US008235411B2

(12) United States Patent
Works et al.

(10) Patent No.: US 8,235,411 B2
(45) Date of Patent: Aug. 7, 2012

(54) SELF-LATCHING AND LOCKING TRAILER COUPLER

(75) Inventors: Joseph W. Works, Humboldt, KS (US); Dirk A. Sorenson, Yates Center, KS (US)

(73) Assignee: B&W Custom Truck Beds, Inc., Humboldt, KS (US)

( * ) Notice: Subject to any disclaimer, the term of this patent is extended or adjusted under 35 U.S.C. 154(b) by 27 days.

(21) Appl. No.: 13/033,824

(22) Filed: Feb. 24, 2011

(65) Prior Publication Data

US 2012/0098236 A1   Apr. 26, 2012

Related U.S. Application Data

(63) Continuation-in-part of application No. 12/250,020, filed on Oct. 13, 2008, now abandoned.

(60) Provisional application No. 61/440,528, filed on Feb. 8, 2011.

(51) Int. Cl.
 *B60D 1/04* (2006.01)
(52) U.S. Cl. ........................ 280/508; 280/507
(58) Field of Classification Search .................. 280/507, 280/508, 511, 513
 See application file for complete search history.

(56) References Cited

U.S. PATENT DOCUMENTS

| 2,061,234 A | 11/1936 | Hoflich |
| 2,143,322 A | 1/1939 | Knobel, Jr. |
| 2,166,208 A | 7/1939 | Dayton |
| 2,178,094 A | 10/1939 | Berluti |
| 2,363,755 A | 11/1944 | Smith |
| 3,139,291 A * | 6/1964 | Geresy ............ 280/507 |
| 3,446,520 A | 5/1969 | Gibson |
| 3,567,253 A | 3/1971 | De Puydt et al. |
| 3,954,286 A * | 5/1976 | Weber ............ 280/512 |
| 4,209,184 A * | 6/1980 | Byers ............ 280/511 |
| 4,241,936 A | 12/1980 | Carruthers et al. |
| 4,527,925 A | 7/1985 | Bauer et al. |
| 4,699,395 A | 10/1987 | Hale |
| 4,763,917 A | 8/1988 | Chambers |

(Continued)

FOREIGN PATENT DOCUMENTS

GB   2056929 A1   3/1981

(Continued)

OTHER PUBLICATIONS

Printout from website www.trailergear.com showing the Quick Coupler manufactured by Trailer Gear, LLC of Latrobe PA; exact date of publication unknown but believed to be more than one year prior to the filing date of the parent application from which the present application claims priority.

*Primary Examiner* — Tashiana Adams
(74) *Attorney, Agent, or Firm* — Erickson, Kernell, Derusseau & Kleypas, LLC

(57) ABSTRACT

A self latching trailer coupler includes a housing having a downwardly oriented ball receiver for receiving a head of a hitch ball and a latch member mounted in the housing which is moveable between open and closed positions. In the closed position, the latch member prevents the hitch ball from being withdrawn from the ball receiver. The latch member automatically moves into the closed position upon insertion of the head of the hitch ball into the ball receiver and retains the latch member in the closed position. A lock assembly is mounted in the housing and is selectively engageable to lock the latch member in the closed position.

30 Claims, 12 Drawing Sheets

U.S. PATENT DOCUMENTS

| | | | | |
|---|---|---|---|---|
| 4,776,607 A | * | 10/1988 | Richter et al. | 280/507 |
| 4,817,979 A | | 4/1989 | Goettker | |
| 5,018,759 A | | 5/1991 | Villalon et al. | |
| 5,255,545 A | | 10/1993 | Wheeler | |
| 5,263,735 A | | 11/1993 | Mann | |
| 5,322,316 A | | 6/1994 | Wheeler | |
| 5,344,174 A | | 9/1994 | Sanders | |
| 5,385,363 A | | 1/1995 | Morey | |
| 5,410,893 A | | 5/1995 | Easterwood | |
| 5,482,309 A | | 1/1996 | Hollis | |
| 5,513,871 A | | 5/1996 | Johnson | |
| 5,632,501 A | * | 5/1997 | Jackson et al. | 280/508 |
| 5,642,960 A | | 7/1997 | Salice | |
| 5,647,686 A | | 7/1997 | Hancock et al. | |
| 5,873,271 A | | 2/1999 | Smith | |
| 5,887,885 A | | 3/1999 | Byers et al. | |
| 6,186,693 B1 | | 2/2001 | Cloyd et al. | |
| 6,234,509 B1 | | 5/2001 | Lara | |
| 6,264,229 B1 | | 7/2001 | Gill et al. | |
| 6,315,315 B1 | | 11/2001 | Seale | |
| 6,393,874 B1 | | 5/2002 | Zapushek et al. | |
| 6,467,793 B2 | | 10/2002 | Putnam | |
| 6,481,740 B1 | * | 11/2002 | Haase et al. | 280/511 |
| 6,505,848 B1 | | 1/2003 | Brown et al. | |
| 6,505,849 B1 | * | 1/2003 | Ebey | 280/513 |
| 6,523,849 B1 | | 2/2003 | Brown et al. | |
| 6,523,850 B1 | | 2/2003 | Brown et al. | |
| 6,540,246 B2 | | 4/2003 | Andersen et al. | |
| 6,616,169 B1 | | 9/2003 | Brown et al. | |
| 6,808,195 B2 | | 10/2004 | Smith | |
| 6,811,176 B2 | | 11/2004 | Brown et al. | |
| 6,880,368 B1 | | 4/2005 | Ulbrich et al. | |
| 7,017,935 B1 | | 3/2006 | Bonfanti | |
| 7,100,937 B2 | | 9/2006 | Hogan | |
| 7,378,013 B2 | * | 5/2008 | Sandler | 280/507 |
| 7,690,673 B1 | * | 4/2010 | Kraai | 280/507 |
| 8,083,249 B2 | * | 12/2011 | Most et al. | 280/507 |
| 2003/0047908 A1 | | 3/2003 | Lara | |
| 2003/0193167 A1 | | 10/2003 | Hall | |
| 2005/0230935 A1 | * | 10/2005 | Sauermann | 280/508 |
| 2007/0069501 A1 | | 3/2007 | Hsai | |
| 2007/0069502 A1 | * | 3/2007 | Sandler | 280/511 |
| 2008/0106067 A1 | | 5/2008 | Kissick | |
| 2008/0129013 A1 | | 6/2008 | Weddendorf | |

FOREIGN PATENT DOCUMENTS

GB 2087817 A1 6/1982

* cited by examiner

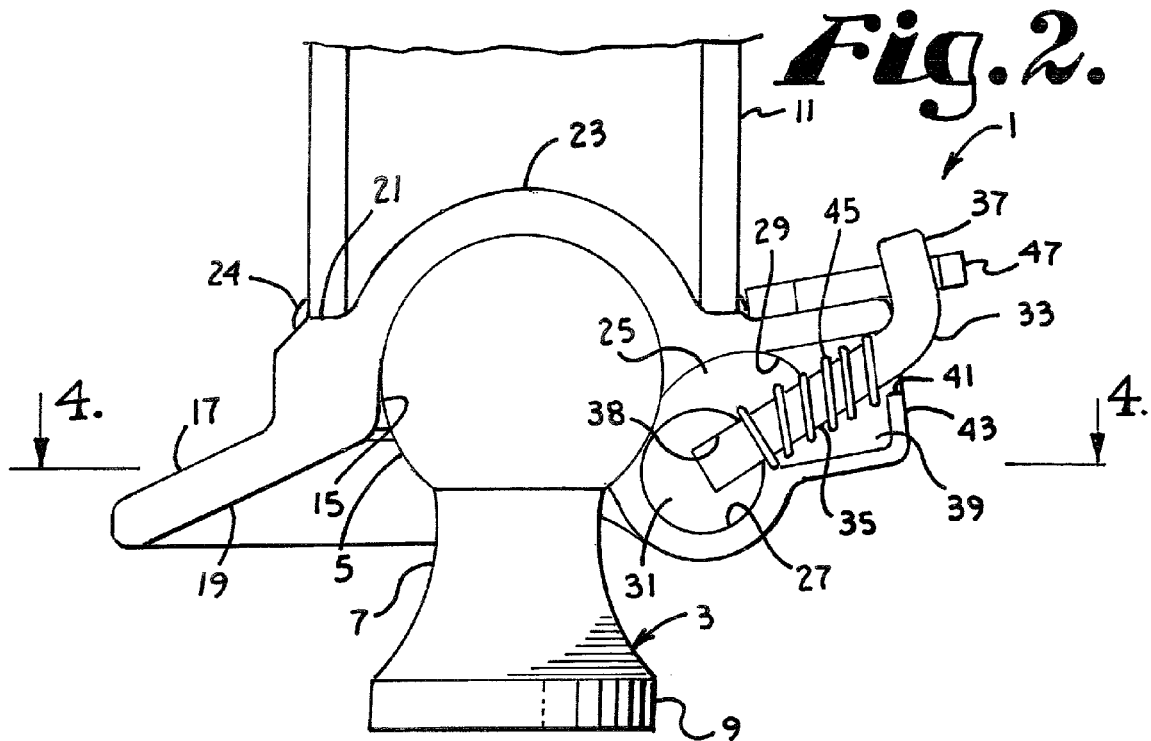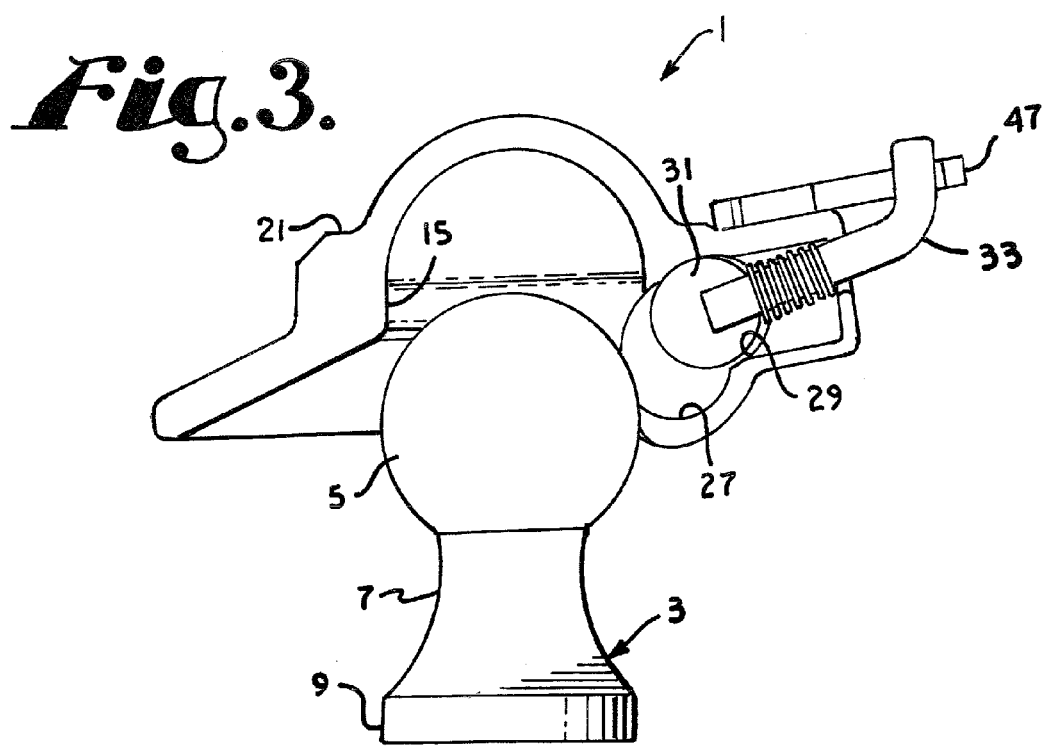

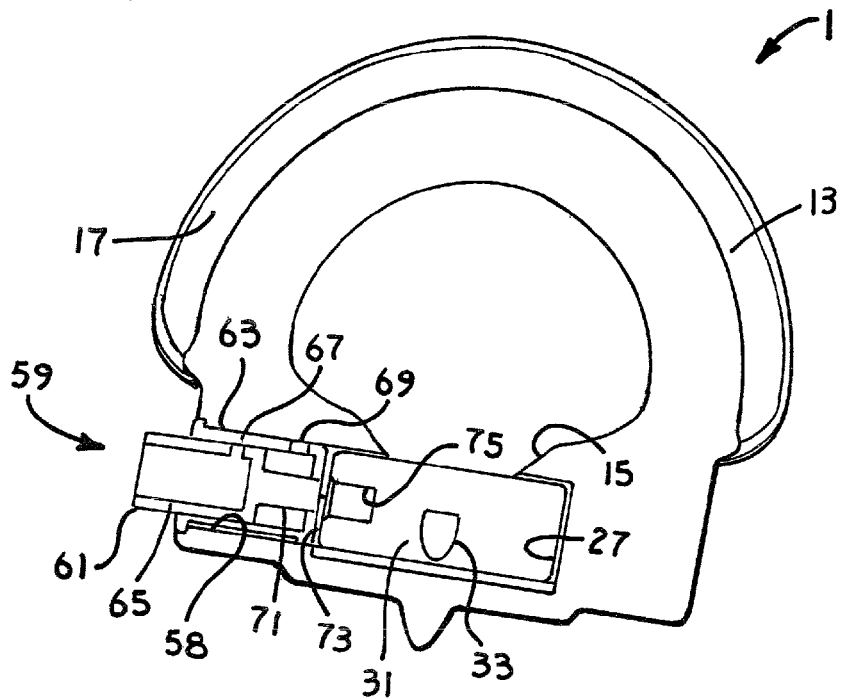
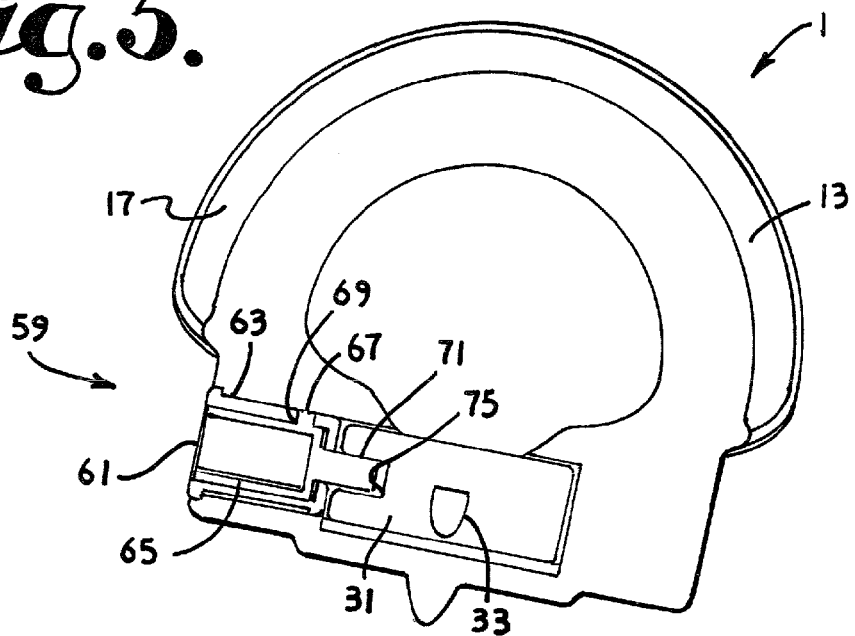

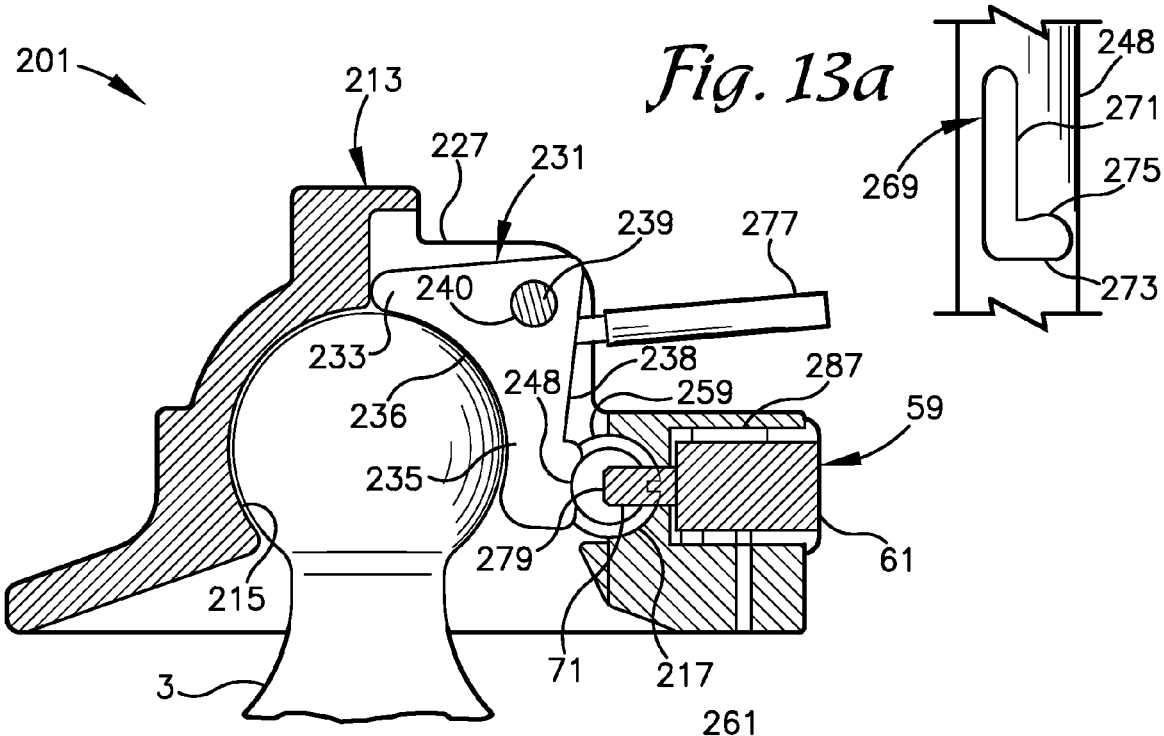
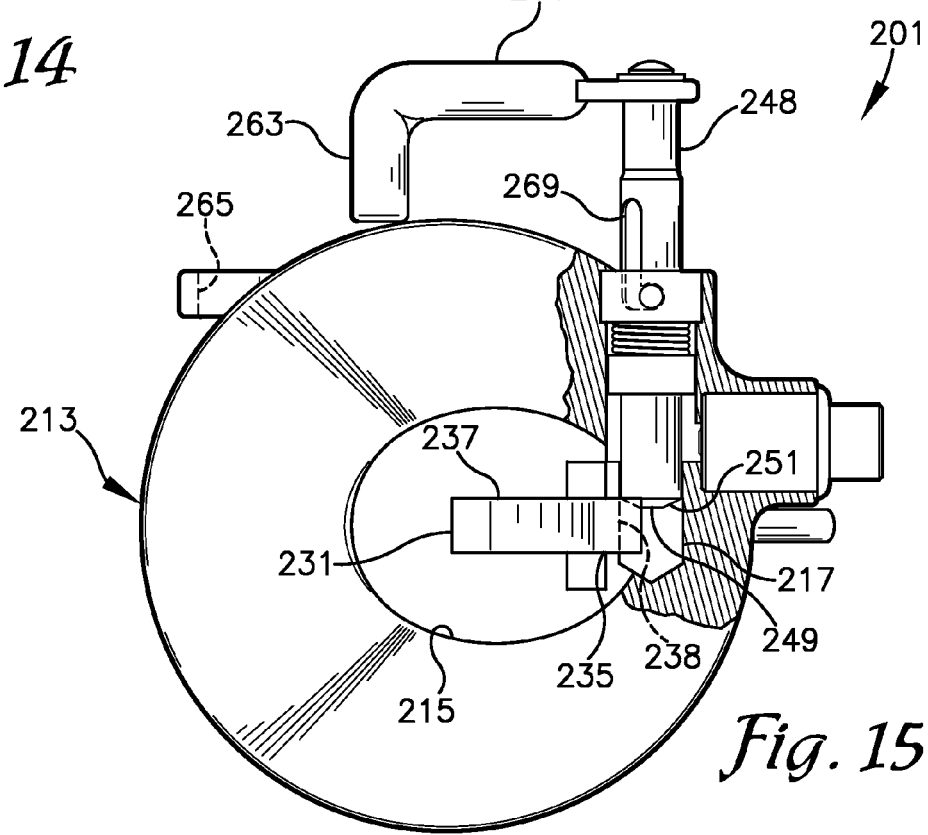

SELF-LATCHING AND LOCKING TRAILER COUPLER

CROSS-REFERENCE TO RELATED APPLICATIONS

This application is a Continuation-In-Part of application Ser. No. 12/250,020 filed Oct. 13, 2008 and also claims the benefit of Provisional Application Ser. No. 61/440,528 filed Feb. 8, 2011.

BACKGROUND OF THE INVENTION

1. Field of the Invention

This invention relates to couplers for attaching trailers to towing vehicles, and in particular to a self-latching coupler which can be locked to prevent theft of a trailer.

2. Description of the Related Art

Various types of trailer couplers have been used to attach a trailer to a towing vehicle. Commonly, a coupler attached to a tongue of the trailer rotatably clamps to a hitch ball on the towing vehicle. Variations on this system are used on both bumper-hitch trailers and "gooseneck" trailers which attach to a ball located in the bed of a truck.

A problem with all trailers (being inherently portable) is that they are relatively easy to steal. A parked trailer may be stolen simply by attaching a suitable towing vehicle and driving off. If the trailer is parked with a towing vehicle attached, the trailer may still be disconnected and then reattached to the thief's vehicle.

In an attempt to prevent such thefts, prior art trailer couplers have often included a hasp for attaching a padlock to lock the coupler in a latched configuration. If a trailer is parked with the coupler locked in the latched position, the trailer cannot be easily hitched to a towing vehicle, and is thus more difficult to steal. Similarly, if the coupler is locked in the latched position while the trailer is attached to a towing vehicle, it becomes more difficult to disconnect it from that towing vehicle. A problem with couplers requiring a padlock, however, is that padlocks are often misplaced or otherwise not available when needed. Furthermore, most padlocks can be fairly easily removed from a trailer coupler using bolt cutters or the like.

Other trailer locks currently in use generally fit around or into a trailer coupler to prevent the trailer from being attached to a towing vehicle. These types of locks must be removed before the trailer is connected and cannot be used on an attached trailer. These locks are also subject to loss when removed from the trailer.

What is needed is a trailer coupler having an integral lock mechanism that cannot be lost or easily defeated using bolt cutters or the like. Such a coupler could be locked in the latched position to prevent theft of the trailer either when the trailer is parked unhitched and unattended, or when the trailer is attached to a towing vehicle.

SUMMARY OF THE INVENTION

In order to provide an improvement upon the prior art, the present invention provides a coupler which may be locked in the latched position to prevent theft of the trailer when the trailer is unhitched, or when the trailer is attached to a towing vehicle.

The present invention comprises a locking coupler for connecting a trailer to a hitch ball on a towing vehicle. The coupler includes a main body with a downwardly oriented receiving cavity formed therein for receiving a generally spherical head of a hitch ball.

In one embodiment of the present invention, the main body further includes a latch pin receiver intersecting the ball receiver. The latch pin receiver has an inwardly and downwardly positioned first lobe opening into the ball receiver and an outwardly and upwardly oriented second lobe. A spring chamber is positioned between the second lobe of the latch pin receiver and an outside wall of the housing.

A latch pin is positioned in the latch pin receiver and is moveable between a closed position in the first lobe and an open position in the second lobe. In the closed position, the latch pin is located to capture the head of a hitch ball in the ball receiver. The latch pin includes a first end having a lock pin receiver formed therein.

A drawbar is connected to the latch pin and extends outwardly therefrom through the spring chamber, and outwardly from the housing through an opening in the outside wall. A compression spring is positioned in the spring chamber and encircles the drawbar. A first end of the spring bears against the latch pin and a second end of the spring bears against the outside wall. The spring acts to urge the latch pin into the closed position. A handle is pivotally connected to an outside of the housing and engages the drawbar. The handle is operable to move the latch pin between the closed position and the open position. Pulling rearwardly on the handle moves the latch pin outwardly and upwardly into its open position. A stop formed on the housing has an upwardly and outwardly sloped upper face and a generally vertical outward face. The outward face of the stop engages an inward edge of the handle when the handle is in its rearward position to retain the latch pin in the open position.

A plunger type lock assembly is mounted in the housing in axial alignment with the first lobe of the latch pin receiver. The lock assembly includes a lock housing and a plunger selectively slidably moveable in the lock housing. The plunger includes a keyed lock cylinder having a lock bolt selectively engageable with a bolt receiver in the lock housing. The plunger further includes a lock pin which extends longitudinally outward from the plunger and is selectively extendable with the lock pin receiver in the latch pin to retain the latch pin in the closed position. If the plunger is pressed inwardly when the latch pin is in the closed position, the lock pin will be received in the lock pin receiver, thereby preventing movement of the latch pin out of the closed position. The lock bolt engages the bolt receiver to retain the plunger in the inward or locked position. The lock assembly is operated with a key to release the lock bolt from the bolt receiver so that the plunger moves outwardly to release the latch pin.

When the coupler is advanced downward over a ball with the latch pin in the closed position, the top of the ball engages the latch pin and urges it upwardly and outwardly. As the latch pin moves, the latch handle moves in an outward direction across the sloped upper face of the stop. Once the latch pin moves past the widest part of the hitch ball, the latch pin automatically moves inwardly into its closed position under the force of the spring. In the closed position, the latch pin is captured in the first lobe of the latch pin receiver. Because of the kidney shape of the latch pin receiver, any separating force attempting to draw the hitch ball out of the ball receiver when the latch pin is in the closed position will only push the latch pin downwardly and more firmly into the first lobe and cannot move it upwardly toward the second lobe. The coupler is thus effectively latched onto the hitch ball.

This feature of automatic latching of the coupler upon insertion of the hitch ball into the ball receiver is referred to as "self-latching." Once the coupler is latched, the lock assembly can then be engaged to prevent unlatching of the coupler by anyone who is not in possession of the key.

In an alternative embodiment of the coupler, an L-shaped latch member is pivotally mounted in a latch member receiver rearward of the ball receiver. The latch member includes an upper leg which extends across the top of the ball receiver and a lower leg which extends downwardly along a rearward portion of the ball receiver. The latch member is moveable from a closed position wherein the lower leg of the hitch ball extends into the ball receiver in position to capture the head of a hitch ball positioned in the ball receiver to an open position wherein the hitch ball can be freely extracted from the ball receiver. A compression spring mounted above the upper leg of the latch member urges it toward its open position.

A rotatable operating shaft is mounted in a shaft receiver rearward of the lower leg of the latch member. The operating shaft includes a cam surface which is engageable with a cam follower formed on the lower leg of the latch member. When the operating shaft is rotated, the cam surface cooperates with the cam follower to move the latch member between its closed and open positions. A operating lever or handle is provided for rotating the operating shaft. A torsional spring urges the operating shaft toward a latched position wherein the latch member is held in its closed position. A detent is provided for holding the operating shaft in an unlatched position in opposition to the torsional spring. When the operating shaft is in its unlatched position, the latch member is allowed to move into its open position. The operating shaft is also moveable into an armed position wherein insertion of the hitch ball into the ball receiver will cause the coupler to self-latch.

Like the first embodiment, this embodiment includes a plunger type lock assembly mounted in the housing. The lock pin of the lock assembly is positioned to be in alignment with a lock pin receiver formed in the operating shaft, when the operating shaft is in its latched position. If the plunger is pressed inwardly when the operating shaft is in the latched position, the lock pin will be received in the lock pin receiver, thereby preventing movement of the operating shaft out of the latched position. The lock assembly is operated with a key to release the lock bolt from the bolt receiver so that the plunger moves outwardly to release the latch pin.

When the coupler is advanced downward over a ball with the operating shaft in the armed position, the top of the ball engages the upper leg of the latch member which pivots the lower leg of the latch member towards the hitch ball and into its closed position. This releases pressure which the latch member previously exerted on the operating shaft and allows the force of the torsional spring to move the operating shaft and its attached operating lever into their latched position, thereby fixing the latch member in its closed position and securely latching the coupler to the hitch ball. The lock assembly can then be engaged to prevent unlatching of the coupler.

Second and third alternative embodiments of the coupler are similar to the second embodiment in that they each includes a similar L-shaped latch member and an operating shaft positioned behind a lower leg of the latch member. The operating shaft in each of these embodiments, however, is axially moveable in addition to being rotatable. The operating shaft may be advanced inwardly into a latched position wherein, the operating shaft extends behind the lower leg of the latch member and prevents rearward movement of the lower leg to retain the latch member in its closed position. The operating shaft may also be slid outwardly into an unlatched position wherein the latch member is free to pivot into its open position. The operating shaft is urged into its latched position by a spring.

The operating shaft includes an L-shaped slot having a longitudinal leg and a circumferentially extending leg. A pin secured to the housing extends into the slot. A handle is axially attached to the operating shaft and is operable to move the operating shaft between the latched position and the unlatched position. By pulling outwardly on the handle and rotating the operating shaft slightly, the operating shaft is retained in the unlatched position by the pin extending into the circumferentially extending leg of the slot. A small notch formed in the circumferentially extending leg of the slot engages the pin to hold the operating shaft in the unlatched position. The weight of the handle and/or the force of a spring, however, urges the operating shaft to rotate in the opposite direction.

A plunger type lock assembly is mounted in the housing. The lock pin of the lock assembly is positioned to be in alignment with a lock pin receiver formed in the operating shaft (and/or in a collar associated therewith) when the operating shaft is in its latched position. If the plunger is pressed inwardly when the operating shaft is in the latched position, the lock pin will be received in the lock pin receiver, thereby preventing movement of the operating shaft out of the latched position. The lock assembly is operated with a key to release the lock bolt from the bolt receiver so that the plunger moves outwardly to release the operating shaft.

When the coupler is advanced downward over a ball with the operating shaft in the unlatched position, the top of the ball engages the lower leg of the latch member as it enters the ball receiver and moves the latch member toward its open position. The latch member nudges the operating shaft and causes the pin to be dislodged from the notch in the circumferentially extending leg of then slot. This allows the operating shaft to rotate until the pin is aligned with the longitudinally extending leg of the slot and an inner end of the operating shaft is resting against a side of the latch member (which has moved into its open position). This may be referred to as the armed position of the operating shaft.

As the coupler continues to advance downwardly, the top of the hitch ball engages the upper leg of the latch member which pivots the lower leg of the latch member towards the hitch ball and into its closed position. This allows the operating shaft to automatically move behind the latch member to its latched position under the force of the spring, thereby self-latching and fixing the latch member in its closed position. The lock assembly can then be engaged to prevent unauthorized unlatching of the coupler.

BRIEF DESCRIPTION OF THE DRAWINGS

FIG. 2 is a cross-sectional view of the coupler taken generally along line 2-2 in FIG. 1 showing the coupler in a latched state.

FIG. 3 is a view similar to FIG. 2 showing the coupler in an unlatched state.

FIG. 4 is a cross-sectional view of the coupler taken generally along line 4-4 in FIG. 2 showing the coupler in a latched and unlocked state.

FIG. 5 is a view similar to FIG. 4 showing the coupler in a latched and locked state.

FIG. 13a is an enlarged, fragmentary view of an operating shaft of the coupler of FIG. 12 showing a generally L-shaped slot formed therein.

FIG. 14 is a cross-sectional view taken generally along line 14-14 in FIG. 13, again showing the coupler in a latched and locked state.

FIG. 15 is a view similar to FIG. 13 showing the coupler in an unlatched state.

DETAILED DESCRIPTION OF THE PREFERRED EMBODIMENTS

Figure 1:
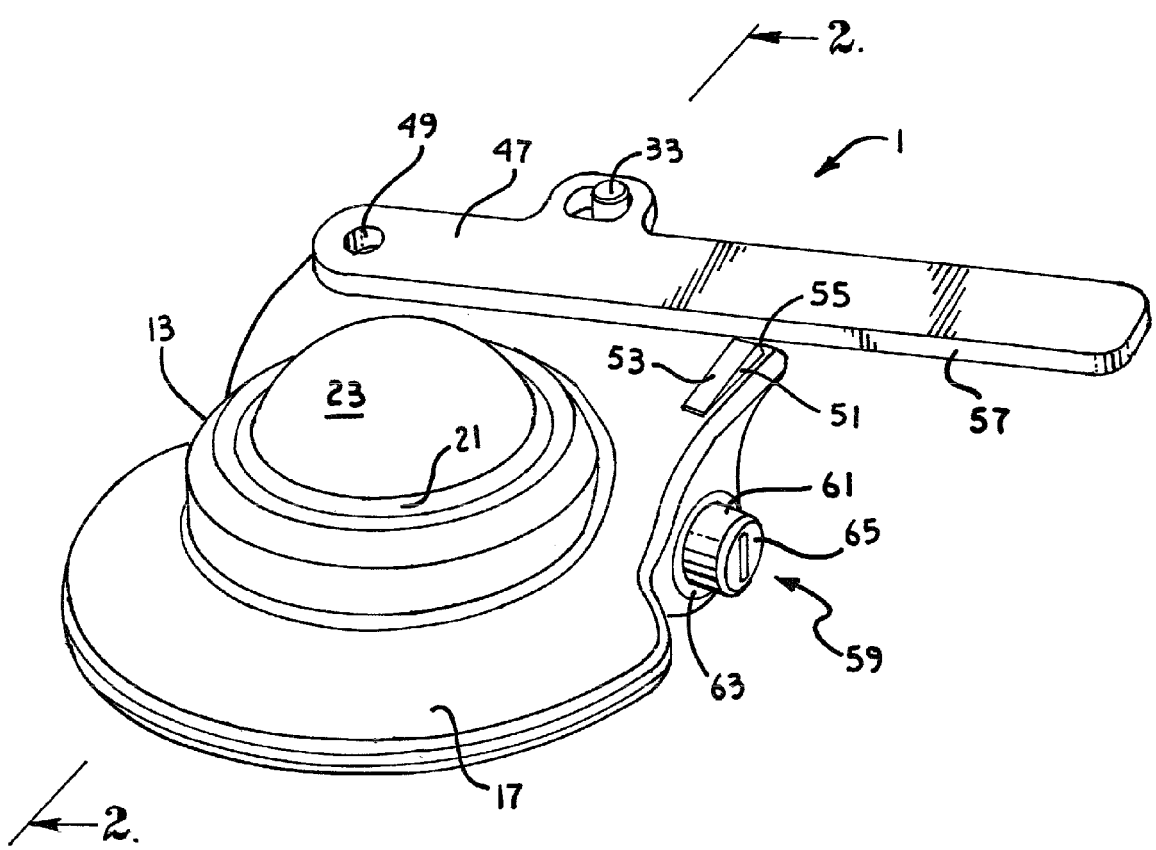
FIG. 1 is a perspective view of a trailer coupler according to the present invention shown in an unlatched and unlocked state.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference number 1 generally designates a locking hitch coupler according to the present invention. The coupler 1 is adapted for mounting on a tongue of a trailer (not shown) and used to connect the trailer to a hitch ball 3 on a towing vehicle (not shown). The hitch ball 3 includes a generally spherical head 5 and narrows below the head 5 to a relatively thin neck 7. Below the neck 7 the hitch ball 3 flares outwardly to form a mounting flange 9. The coupler 1 is lowered onto the hitch ball 3 and raised off of the hitch ball 3 by means of a jack (not shown) mounted on the trailer.

The coupler 1 will be shown and described as being for use with a "gooseneck" type trailer having an extended tongue with a downwardly extending post 11 upon which the coupler 1 is mounted. In gooseneck applications, the coupler 1 attaches to a hitch ball 3 mounted in a central location of a truck bed on the towing vehicle. It is to be understood, however, that the present invention can easily be adapted for use with other types of trailers, such as bumper pull trailers.

Referring to FIGS. 2 and 3, the hitch 1 includes a housing 13 which has a generally hemispherical ball receiver 15 formed therein for receiving the head 5 of the hitch ball 3. The ball receiver 15 opens downwardly such that the coupler 1 may be lowered onto the hitch ball 3. The ball receiver 15 is partially surrounded by a lip 17 which extends generally radially outward from the housing 13 in the forward and lateral directions. The lip 17 presents a lower surface 19 which is angled upwardly and inwardly to help guide the hitch ball 3 into the ball receiver 15. An upper portion of the housing 13 presents an annular ledge 21 which is sized to abut against a lower end of the post 11 of the trailer tongue. Radially inward from the ledge 21a domed protrusion 23 extends upwardly into the tubular post 11. The coupler 1 is typically welded to the post 11 with a bead 24 applied around the joint where the lower end of the post 11 meets the ledge 21.

A latch pin receiver 25 is formed in the housing 13 adjacent the ball receiver 15 and generally transverse to the ball receiver 15. The latch pin receiver 25 is oblong and generally upwardly and outwardly sloped in cross section, and preferably has a generally kidney shaped cross-section with a lower and inward first lobe 27 and an upper and outward second lobe 29. The first lobe 27 of the latch pin receiver 25 intersects the ball receiver 15. The latch pin receiver 25 receives a generally cylindrical latch pin 31 which is laterally moveable from a closed position in the first lobe 27 of the latch pin receiver 25 (see FIG. 2) to an open position in the second lobe 29 of the latch pin receiver 25 (see FIG. 3). In the closed position, the latch pin 31 extends into the ball receiver 15 at a position below the widest part of the head 5 of a hitch ball 3 seated in the receiver 15, thereby trapping the hitch ball 3 in the ball receiver 15. When the latch pin 31 is in the open position, the hitch ball head 5 is unobstructed by the latch pin 31 and is freely moveable out of the ball receiver 15.

Connected to the latch pin 31 and extending outwardly therefrom is a drawbar 33. The drawbar 33 is generally L-shaped and includes a long leg 35 and a short leg 37. The distal end of the long leg 35 is fixedly received in a drawbar receiver 38 formed in the latch pin 31 midway along the length of the latch pin 31. The long leg 35 extends outwardly from the latch pin 31, through a spring chamber 39, and exits the housing 13 through an opening 41 in an outside wall 43 of the spring chamber 39. The opening 41 is generally aligned with the second lobe 29 of the latch pin receiver 25, and it is thus outward of and above the first lobe 27. The short leg 37 extends upwardly from the long leg 35 outside of the housing 13.

A compression spring 45 positioned in the spring chamber 39 of the housing 13 has a first end which bears against the latch pin 31 and a second end which bears against the outside wall 43 of the spring chamber 39. The spring 45 acts to urge the latch pin 31 inwardly toward its closed position.

Referring top FIG. 1, a latch handle 47 is pivotally mounted on the outside of the housing 13 for movement about a pivot pin 49. The latch handle 47 pivotally engages the short leg 37 of the drawbar 39. Moving the handle 47 outwardly pulls on the drawbar 39 and moves the latch pin 31 upwardly and outwardly against the bias of the spring 45 to its open position. A stop 51 formed on the housing 13 has an upwardly and outwardly sloped upper face 53 and a generally vertical outward face 55. The outward face 55 of the stop 51 engages an inward edge 57 of the handle 47 when the handle 47 is in its outward position to retain the latch pin 31 in the open position.

It should be noted that the shape of the stop 51 allows the coupler 1 to be self-latching. If the coupler 1 is lowered onto the hitch ball 3 with the latch pin 31 in its closed position, the head 5 of the hitch ball 3 will urge the latch pin 31 upwardly and outwardly toward its open position. As the latch pin 31 moves, the latch handle 47 will move freely in an outward direction across the sloped upper face 53 of the stop 51. The inward edge 57 of the handle 47 will not move outwardly far enough to engage the outward face 55 of the stop 51. Once the latch pin 31 moves past the widest part of the head 5, the spring 45 will start to move the latch pin 31 inwardly back toward its closed position. The latch pin 31 will automatically move into its closed position once it moves sufficiently past the head 5. In the closed position, the latch pin 31 is effectively captured in the first lobe 27 of the latch pin receiver 25 and will not become unlatched unless the latch handle 47 is manually moved to its outward position. Because of the shape of the latch pin receiver 25, any separating force attempting to draw the hitch ball 3 out of the ball receiver 15 when the latch pin 31 is in the closed position will only push the latch pin 31 downwardly and more firmly into the first lobe 27 and cannot move it upwardly toward the second lobe 29.

Referring to FIGS. 4 and 5, a lock receiver 58 is formed in the housing 13 adjacent to and in longitudinal alignment with the first lobe 27 of the latch pin receiver 25. The lock receiver 58 receives a plunger type lock assembly 59 which includes a lock plunger 61 selectively slidably moveable in a lock housing 63 between an inward locked position (see FIG. 5) and an outward unlocked position (see FIG. 4). A suitable lock assembly is the P491 Extra Security Heavy Duty Pushlock manufactured by Camlock Systems Ltd. of Eastbourne, East Sussex, UK. The lock housing 63 may be secured in the lock receiver 58 using a roll pin, set screw or the like, or the lock housing 63 may have external threads to receive nut (not shown) to retain the housing 63 in the receiver 58. A spring (not shown) may be used to bias the plunger 61 outwardly toward the unlocked position. The plunger 61 includes a keyed lock cylinder 65 having a lock bolt 67 selectively engageable with a bolt receiver 69 in the lock housing 63. The bolt receiver 69 is positioned to receive the bolt 67 when the plunger is in its locked position. The lock housing 63 may further include a second bolt receiver (not shown) positioned to receive the bolt 67 when the plunger is in its unlocked position. The plunger 61 further includes a lock pin 71 which extends longitudinally outward from the plunger 61 and is selectively extendable from the lock housing 63 by sliding the plunger 61 inwardly in the housing 63.

The latch pin 31 includes a first end 73 which is adjacent the lock assembly 59 when the latch pin 31 is in the closed position. The first end 73 of the latch pin 31 includes a lock pin receiver 75 sized and shaped to receive the lock pin 71 of the lock assembly 59. The plunger 61 of the lock assembly 59 may be pressed inwardly when the latch pin 31 is in the closed position causing the lock pin 71 to be received in the lock pin receiver 75. Once the plunger 61 is fully depressed, the lock bolt 67 will engage the bolt receiver 69, thereby preventing the lock pin 71 from pulling out of the lock pin receiver 75. With the lock pin 71 engaged with the lock pin receiver 75, the latch pin 31 cannot be moved out of the closed position. This will prevent the coupler 1 from being removed from a hitch ball 3 if the trailer is currently connected to a towing vehicle, or will prevent the coupler 1 from accepting a hitch ball 3 if the trailer is not currently connected. In either event, theft of the trailer is substantially inhibited.

The lock assembly 59 is operated with a key (not shown) to release the lock pin 71 from the locked position. The key is inserted into the lock cylinder 65 and turned, thereby releasing the lock bolt 67 from the bolt receiver 69. The lock cylinder 65 will then move outwardly relative to the lock housing 63, drawing the lock pin 71 out of the lock pin receiver 75 in the latch pin 31. With the lock pin 71 disengaged from the lock pin receiver 75, the latch pin 31 can be moved to its open position by pulling the handle 47 outwardly until the inward edge 57 of the handle 47 engages the outward face 55 of the stop 51 to hold the latch pin 31 in the unlatched position until released.

FIGS. 6-11 depict a first alternative embodiment of the coupler, which is denominated herein as coupler 101. Like the coupler 1, the coupler 101 includes a housing 113 which has a generally hemispherical ball receiver 115 formed therein for receiving the head 5 of the hitch ball 3. The housing 113 generally includes the same external features as the housing 13 described above and is mounted on the post 11 of the trailer tongue in same manner.

Figure 8:
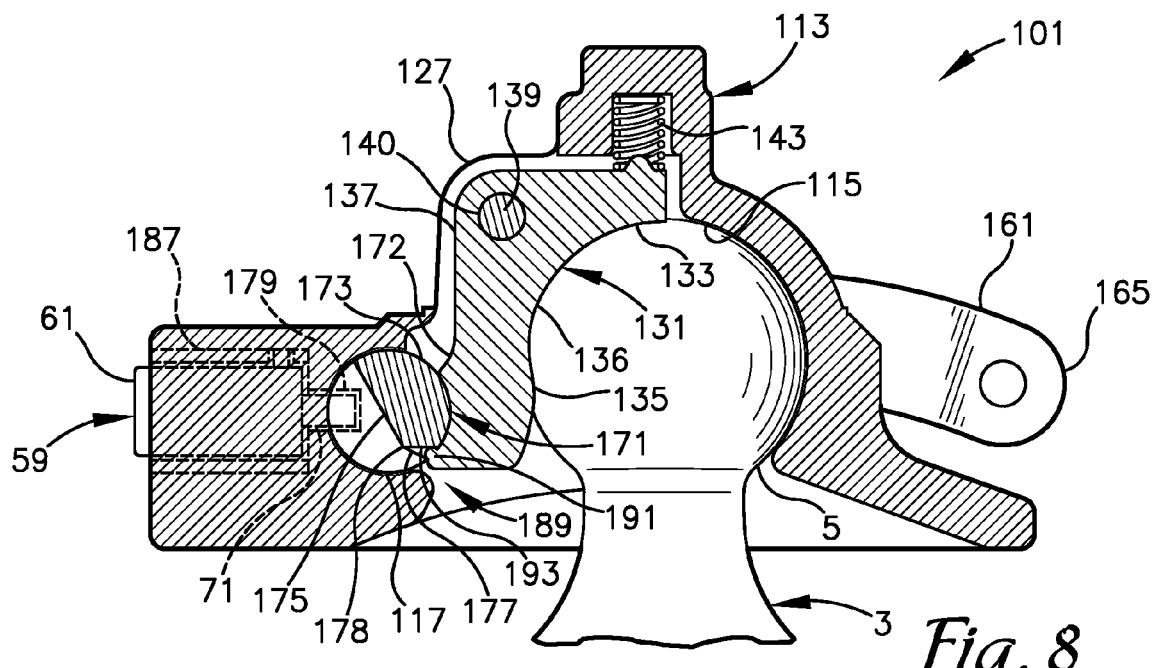
FIG. 8 is a cross-sectional view taken generally along line 8-8 in FIG. 7 showing the coupler in a latched and locked state.

As best seen in FIG. 8, the housing 113 includes a shaft receiver 117 which is formed in the housing 113 rearward of the ball receiver 115 and generally transverse to the ball receiver 115. A latch member receiver 127 is formed in the housing 113 between the ball receiver 115 and the shaft receiver 117 and intersects both the ball receiver 115 and the shaft receiver 117. The latch member receiver 127 receives a generally L-shaped latch member 131. The latch member 131 includes an upper leg 133 and a lower leg 135. An inner surface 136 of the latch member 131 generally matches the profile of the hitch ball 3 and generally defines a lower margin of the upper leg 133 and a forward margin of the lower leg 135. The lower leg 135 further includes a rearward surface 137. The latch member 131 is pivotally connected to the housing 113 by a pivot pin 139. The pivot pin 139 extends through a pivot pin receiver 140 in the latch member 131 and aligned openings 141 in the housing 113 (see FIG. 6). The pivot pin receiver 140 is located proximate the juncture of the upper leg 133 with the lower leg 135.

Figure 9:
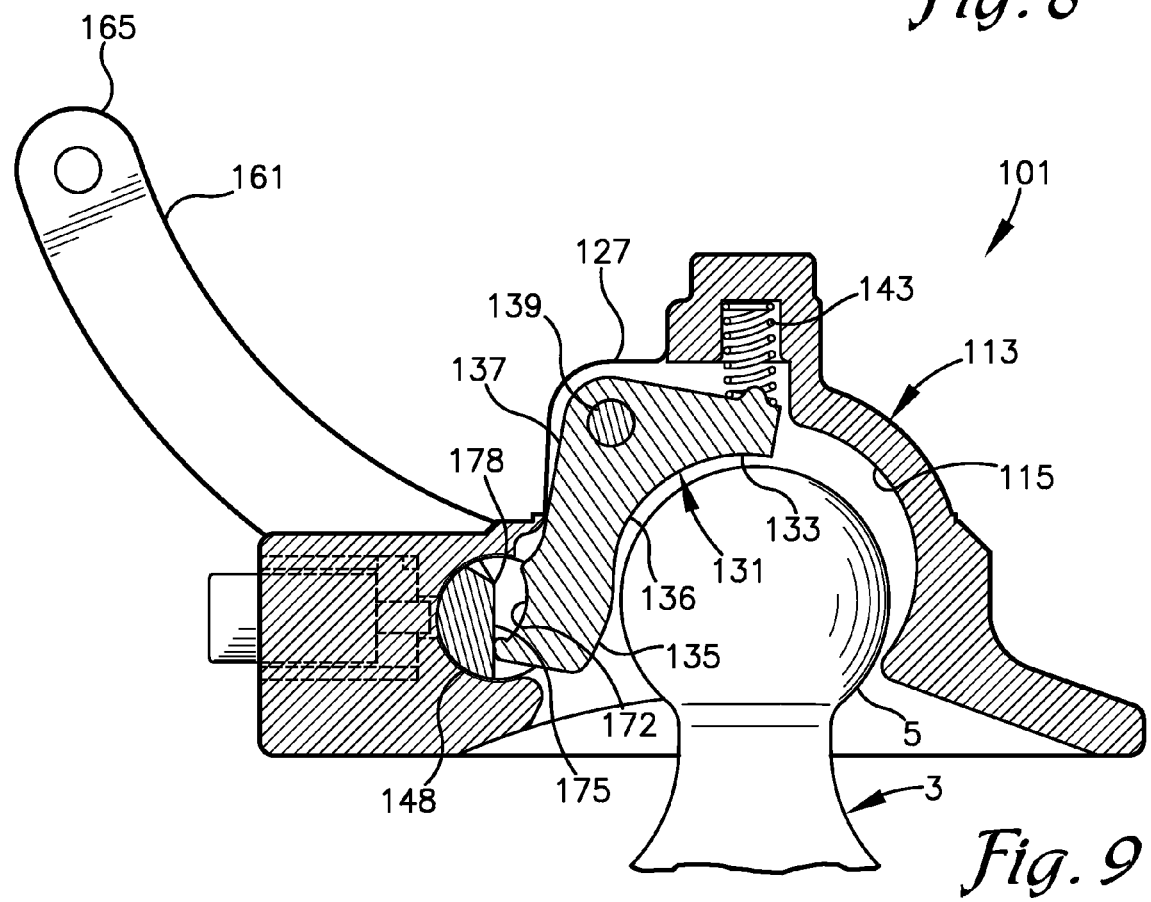
FIG. 9 is a view similar to FIG. 8 showing the coupler in an unlatched state.
Figure 10:
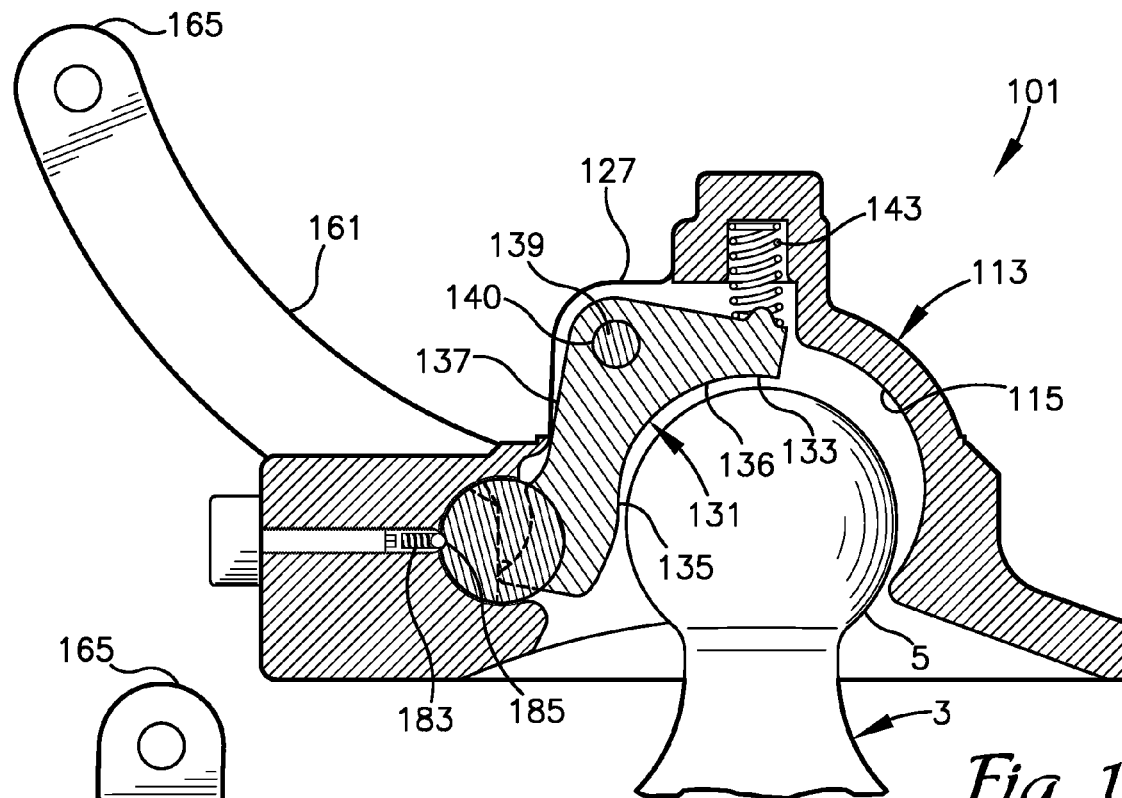
FIG. 10 is a cross-sectional view taken generally along line 10-10 in FIG. 7 showing the coupler in an unlatched state.

The latch member 131 is pivotally movable about the pivot pin 139 from an open position to a closed position. Referring again to FIG. 8, in the closed position, the lower leg 135 of the latch member 131 extends into the ball receiver 115 at a position below the widest part of the head 5 of a hitch ball 3 seated in the ball receiver 115 to prevent the head 5 of the hitch ball 3 from being withdrawn from the ball receiver 115. As shown in FIGS. 9 and 10, in the open position, the head 5 of the hitch ball 3 is unobstructed by the lower leg 135 of the latch member 131 and is freely moveable in and out of the ball receiver 115. A compression spring 143, positioned between the upper leg 133 of the latch member 131 and the housing 113, urges the latch member 131 toward the open position.

Figure 6:
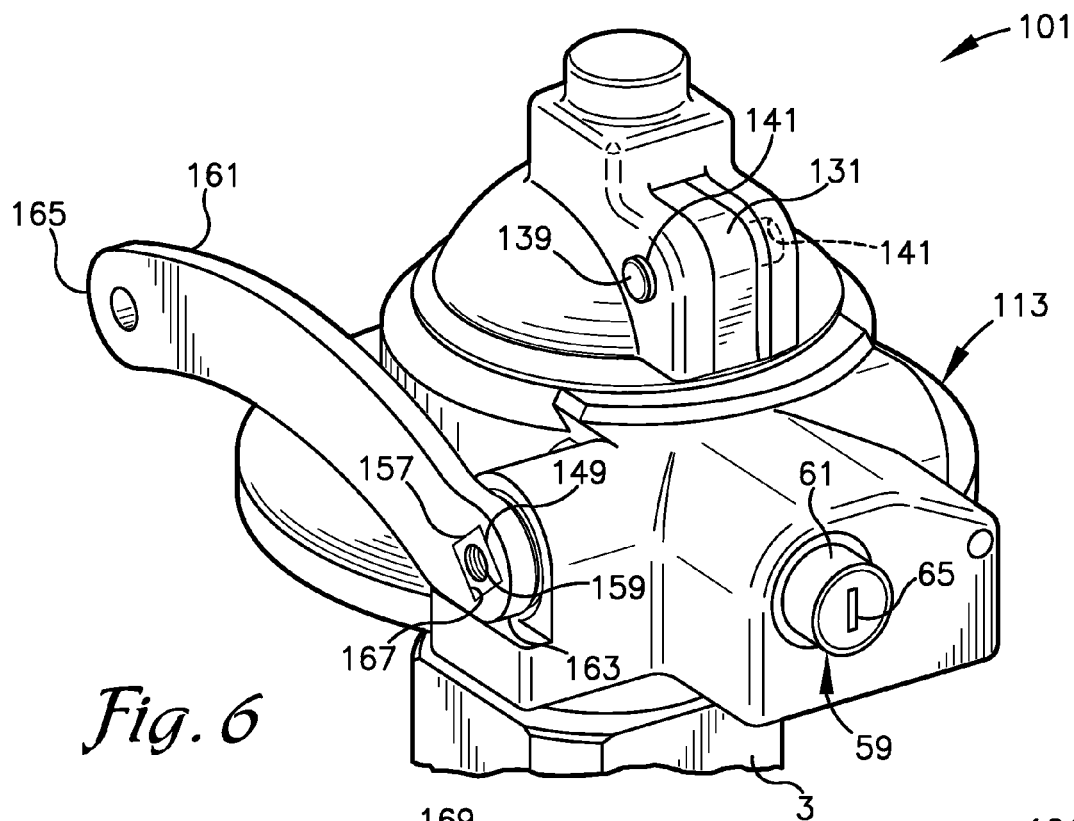
FIG. 6 is a perspective view of an alternative embodiment of the coupler; a bolt which attaches an operating handle to an operating shaft thereof has been intentionally left off to show detail which would normally be obscured by the bolt.
Figure 7:
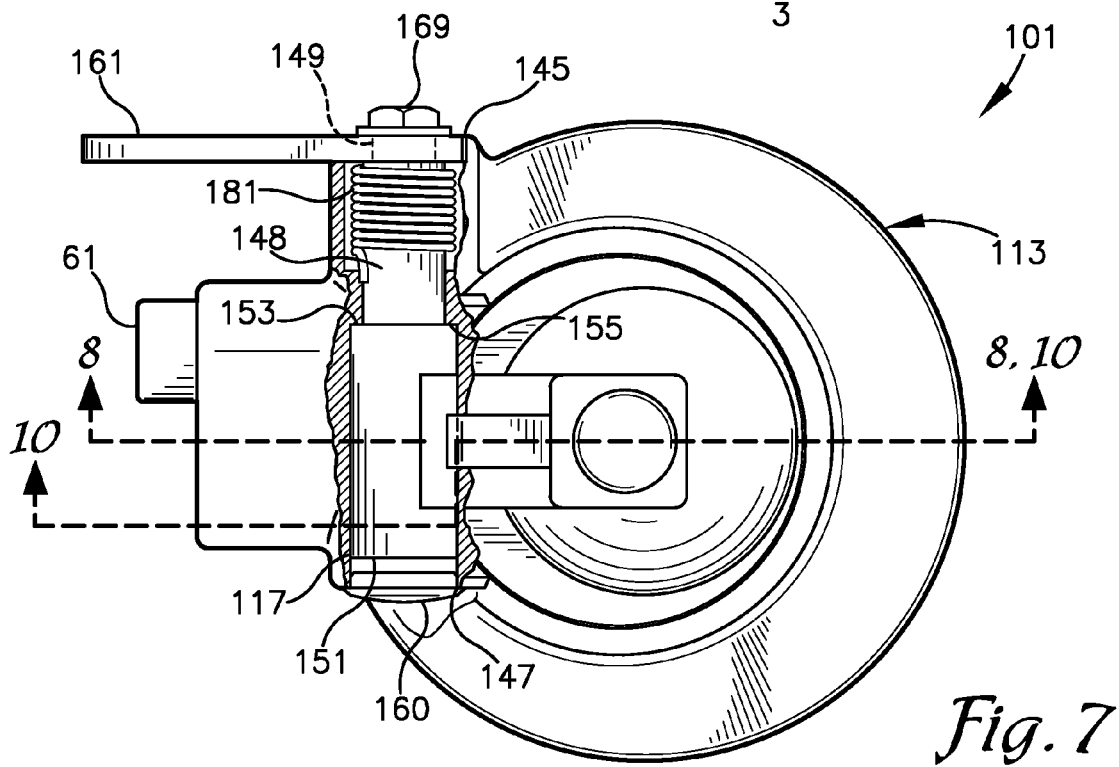
FIG. 7 is a top plan view of the coupler of FIG. 6 with a portion of the housing thereof broken away to show interior detail.

Referring to FIG. 7, the shaft receiver 117 includes a first open end 145 and a second open end 147 and receives a generally cylindrical operating shaft 148, which includes first and second ends 149 and 151, respectively, which correspond to the first and second ends 145 and 147 of the shaft receiver 117. The operating shaft 148 is of reduced diameter for a portion of its length extending from the first end 149 to an annular shoulder 153. The shoulder 153 engages a corresponding shoulder 155 formed in the housing 113 and extending into the shaft receiver 117. Contact between the shoulders 153 and 155 prevents the operating shaft 148 from being removed from the shaft receiver 117 through the first open end 145. As shown in FIG. 6, the first end 149 of the operating shaft 148 further includes a longitudinally extending square shoulder 157 and an axially located bolt receiver 159. Referring again to FIG. 7, a cap 160 is placed over the second end 147 of the shaft receiver 117, thereby concealing the second end 151 of the operating shaft 148 and preventing dirt and moisture from entering the shaft receiver 117.

As best seen in FIG. 6, an operating lever 161 is attached to the first end 149 of the operating shaft 148 and is operable to selectively rotate the operating shaft 148. The operating lever 161 includes a proximate end 163 and a distal end 165. The proximate end 163 of the operating lever 161 includes a square hole 167 sized and shaped to receive the square shoulder 157 of the operating shaft 148. An attaching bolt 169 (see FIG. 7) received in the bolt receiver 159 secures the operating lever 157 to the operating shaft 148. The operating lever 161 and attaching bolt 169 further act to retain the operating shaft 148 in the shaft receiver 117 by preventing the operating shaft 148 from being removed through the second end 147 of the shaft receiver 117.

Referring to FIG. 8, the operating shaft 148 includes a cam surface 171 which engages a follower 172 formed on the rearward surface 137 of the lower leg 135 of the latch member 131. The cam surface 171 includes a first segment 173 which comprises a portion of the outer surface of the operating shaft 148 and which extends about halfway around the operating shaft 148. The cam surface 171 further includes an indented and generally flat second segment 175 and a third segment 177 formed at an angle to the second segment 175. The second segment 175 and third segment 177 meet at a vertex 178. The first through third segments 173, 175 and 177 combine to form a continuous cam surface 171, wherein the first segment 173 is spaced furthest from the center axis of the operating shaft 148 and the normal distance between the second segment 175 and the center axis is the shortest distance. The operating shaft 148 further includes a radially extending lock pin receiver 179, which is positioned between the annular shoulder 153 and the cam surface 171.

The cam surface 171 cooperates with the follower 172 to move the latch member 131 between its open and closed positions upon rotation of the operating shaft 148. Referring again to FIG. 8, the latch member 131 is retained in its closed position when the operating lever 161 is fully forward and the operating shaft 148 is rotated such that the first segment 173 of the cam surface 171 is against the follower 172 and the lower leg 135 of the latch member 131 is pushed to its forwardmost position. This may be referred to as the latched position of the operating shaft 148 and handle 161.

As the operating shaft 148 is rotated, the follower 172 moves out of contact with the first segment 173 of the cam surface 171, allowing the lower leg of the latch member 131 to move rearwardly and toward its open position. Referring to FIGS. 9 and 10, when the follower 172 is only in contact with the second segment 175 of the cam surface 171, the latch member 131 is allowed to move rearwardly to its open position so that the hitch ball 3 can be withdrawn from the ball receiver 115. In this "unlatched position" of the operating shaft 148 (and the attached operating lever 161), the lower leg 135 of the latch member 131 still extends slightly into the ball receiver 115.

A torsional spring 181 (see FIG. 7) positioned around the operating shaft 148 and connected between the operating lever 161 and the housing 113 urges the operating lever 161 forwardly and into its latched position. Referring to FIG. 10, a spring and ball detent 183 is installed in the housing 113 in alignment with the shaft receiver 117 such that the detent 183 engages a recess 185 in the operating shaft 148 when the operating shaft 148 is rotated into its unlatched position. The detent 183 engaging the recess 185, which collectively may be referred to as a catch, provides resistance to the force of the torsional spring 181 to hold the operating shaft 148 unlatched position until the resistance is overcome. Force exerted by the compression spring 143 is transmitted through the latch member 131 and causes the cam follower 172 to press against the cam surface 171, providing further resistance to the action of the torsional spring 181.

Figure 11:
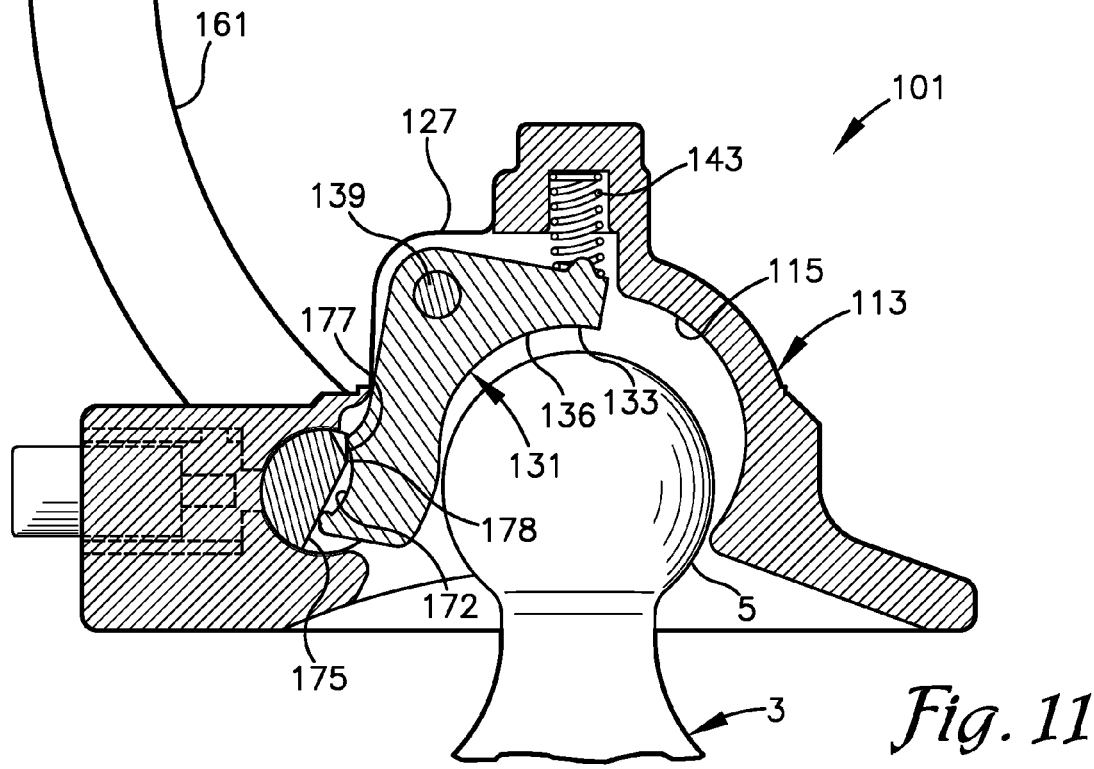
FIG. 11 is a view similar to FIGS. 8 and 9 showing the coupler in an armed state prepared for self-latching.

Referring to FIG. 11, a third position of the operating shaft 148 may be referred to as its armed position. In the armed position, the follower 172 is resting against both the second segment 175 and third segment 177 of the cam surface 171, with the vertex 178 nested therebetween. In this position the force transmitted through the latch member 131 from the compression spring 143 is sufficient to prevent spontaneous rotation of the operating shaft 148 and the detent 183 is not engaged with the recess 185. The operating lever 161 is in a position slightly forward of its unlatched position. When the operating shaft 148 is in the armed position, a lower portion of the upper leg 133 of the latch member 131 extends into the hitch ball receiver 115 in position to be engaged by the top of the hitch ball 3.

As best seen in FIG. 8, a lock receiver 187 is formed in the housing 113 adjacent and perpendicular to the shaft receiver 117. The lock receiver 187 receives a plunger type lock assembly 59. The plunger type lock assembly 59 has the features of the lock assembly 59 as described above in relation to the first embodiment 1 of the coupler assembly and is installed in the same manner. When the operating shaft 148 is in the latched position, the lock pin receiver 179 formed in the operating shaft 148 is aligned with the lock pin 71 formed on the plunger 61 of the lock assembly 59. The plunger 61 of the lock assembly 59 may be pressed inwardly when the operating shaft 148 is in the latched position causing the lock pin 71 to be received in the lock pin receiver 179. Once the plunger 61 is fully depressed, the lock bolt 67 will engage the bolt receiver 69 (see FIGS. 4 and 5), thereby preventing the lock pin 71 from pulling out of the lock pin receiver 179. With the lock pin 71 engaged with the lock pin receiver 179, the operating shaft 148 cannot be moved out of the latched position, nor can the latch member 131. This will prevent the coupler 101 from being removed from a hitch ball 3 if the trailer is currently connected to a towing vehicle, or will prevent the coupler 101 from accepting a hitch ball 3 if the trailer is not currently connected. In either event, theft of the trailer is substantially inhibited.

The lock assembly 59 is operated with a key (not shown) to release the lock pin 71 from the locked position. The key is inserted into the lock cylinder 65 and turned, thereby releasing the lock bolt 67 from the bolt receiver 69. The lock cylinder 65 will then move outwardly relative to the lock housing 63, drawing the lock pin 71 out of the lock pin receiver 179 in the operating shaft 148.

With continued reference to FIG. 8, the coupler 101 further includes a safety interlock 189 which prevents the operating shaft 148 from coming out of the shaft receiver 117 through the second end 147 thereof, should the operating lever 161 fall off or be dislodged when the operating shaft 148 is in its latched position, even if the lock assembly 59 is not engaged. This could occur, for example, when the trailer is being towed down the road and the attaching bolt 169 vibrates loose. The safety interlock 189 includes a protrusion 191 formed on the cam follower 172 and a notch 193 formed in the cam surface 171 of the operating shaft 148 at the intersection of the first section with the third section When the operating shaft 148 and latch member 131 are in their latched positions, the protrusion 191 is captured in the notch 193, thereby preventing the operating shaft 148 from moving in either axial direction.

In use, the coupler 101 is fixedly mounted to the tongue of a trailer (not shown) and used to connect the trailer to the hitch ball 3 of a towing vehicle (not shown). To connect the trailer to the towing vehicle, the coupler 101 is set with the operating shaft 148 in the armed position (see FIG. 11) and the towing vehicle is parked with the ball 3 under the coupler 101 with the ball receiver 115 over the hitch ball 3. The tongue of the trailer is then lowered toward the hitch ball 3, typically by using a jack mounted on the trailer.

As the hitch ball 3 enters the ball receiver 115, its passage is unimpeded by the latch member 131, which is in its open position. When the top of the hitch ball 3 contacts the upper leg 133 of the latch member 131, the upper leg 133 is urged upwardly, causing the latch member 131 to pivot about the pivot pin 139 toward its closed position. As the latch member 131 pivots, the lower leg 135 moves forwardly, causing the cam follower 172 to move away from the cam surface 171 and releasing pressure that the latch member 131 was exerting against the operating shaft 148. The force of the torsional spring 181 then starts to move the operating shaft 148 and operating lever 161 toward their latched positions. When the head 5 of the hitch ball 3 moves fully past the lower leg 135 of the latch member 131, the latch member 131 moves fully into its closed position (see FIG. 8) and the operating shaft 148 and operating lever 161 move into their latched position. The ball 3 cannot then be withdrawn from the ball receiver 115. Because the coupler 101 latches onto the ball 3 automatically upon being lowered onto the ball 3 it can be considered "self-latching."

Once the coupler 101 is latched onto the ball 3, the lock assembly 59 can then be engaged to lock the operating shaft 148 in position. The trailer cannot then be removed from the towing vehicle without use of the key.

To remove the trailer from the towing vehicle, the key is inserted into the lock assembly 59 and turned, thereby releasing the lock pin 71 from the lock pin receiver 179 in the operating shaft 148. The operating lever 161 is then moved rearwardly to its unlatched position, thereby rotating the operating shaft 148 into its unlatched position and the detent 183 into engagement with the recess 185 (see FIG. 10). The trailer is then jacked upwardly. As the coupler 101 moves upwardly relative to the ball 3, the latch member moves freely into its open position, allowing the ball 3 to exit the ball receiver 115.

It should be noted that as the head 5 of the ball 3 moves past the lower leg 135 of the latch member 131 (with the operating shaft 148 in its unlatched position as shown in FIG. 9), the ball 3 nudges the lower leg 135 rearwardly. This rearward motion of the lower leg 135 causes the follower 172 to act on the cam surface 171 of the operating shaft 148 and rotates the operating shaft 148 into its armed position, as shown in FIG. 11, overcoming the resistance of the detent 183 in the process. The coupler 101 is then armed and ready to be reconnected to a towing vehicle without the need to reposition the operating lever 161. The coupler 101 can, therefore, be said to be "self-arming" as well as "self-latching."

FIGS. 12-17 depict a second alternative embodiment of the coupler, denominated herein as coupler 201. The coupler 201 includes a housing 213 which, like the housing 113 described above, has a generally hemispherical ball receiver 215 formed therein, a shaft receiver 217 formed rearward of the ball receiver 215 generally transverse thereto, and a latch member receiver 227 which intersects both the ball receiver 215 and the shaft receiver 217.

The latch member receiver 227 receives a generally L-shaped latch member 231. The latch member 231 includes an upper leg 233 and a lower leg 235. An inner surface 236 of the latch member 231 generally matches the profile of the hitch ball 3 and generally defines a lower margin of the upper leg 233 and a forward margin of the lower leg 235. The lower leg 235 further includes an outer side surface 237 and a rearward surface 238. The latch member 231 is pivotally connected to the housing 213 by a pivot pin 239. The pivot pin 239 extends through a pivot pin receiver 240 in the latch member 231 and aligned openings 241 in the housing 213. The pivot pin receiver 240 is located proximate the juncture of the upper leg 233 with the lower leg 235.

Figure 17:
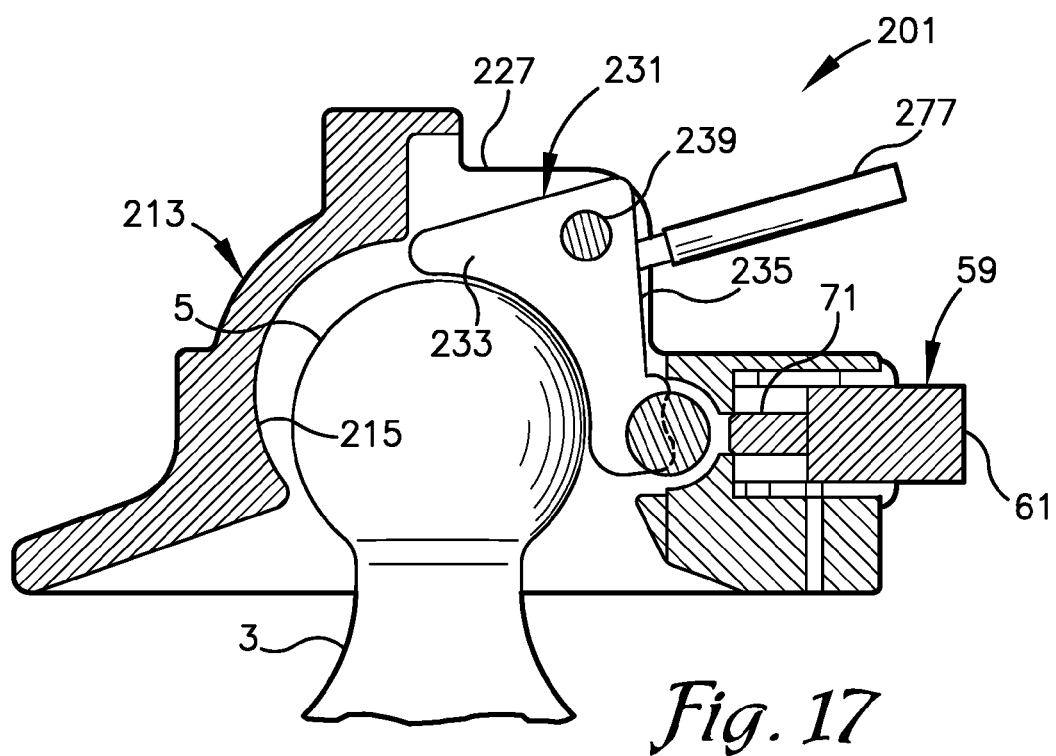
FIG. 17 is a cross-sectional view taken generally along line 17-17 in FIG. 16.
Figure 18:
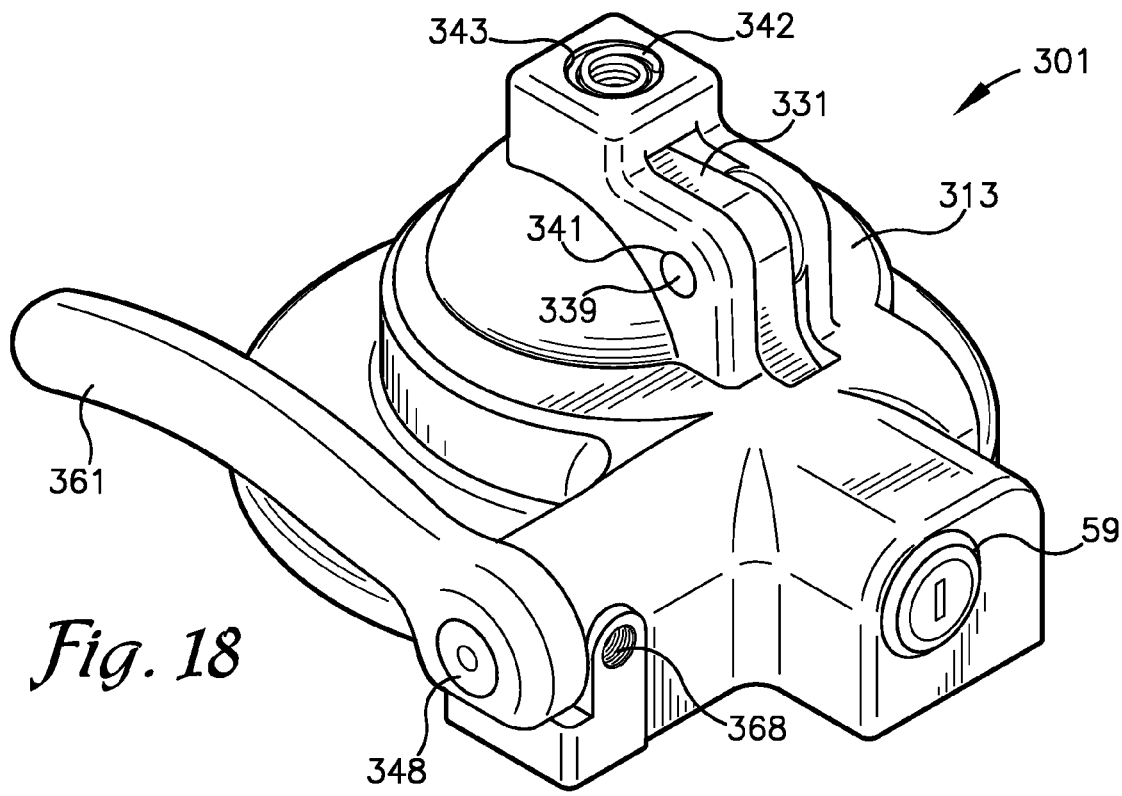
FIG. 18 is a perspective view of a third alternative embodiment of the coupler.

The latch member 231 is pivotally movable about the pivot pin 239 from an open position to a closed position. Referring to FIG. 14, in the closed position, the lower leg 235 of the latch member 231 extends into the ball receiver 215 at a position below the widest part of the head 5 of a hitch ball 3 seated in the ball receiver 215 to prevent the head 5 of the hitch ball 3 from being withdrawn from the ball receiver 215. In the open position, as shown in FIG. 17, the head 5 of the hitch ball 3 is unobstructed by the lower leg 235 of the latch member 231 and is freely moveable in and out of the ball receiver 215.

The shaft receiver 217 has a single open end 242 and receives a generally cylindrical operating shaft 248 therethrough. The operating shaft 248 is slidably moveable within the shaft receiver 217 and includes an interior end 249 with a beveled edge surface 251, giving the interior end 259 a frusto-conical shape. The interior end 249 is aligned with a beveled receiver 253 formed in the housing 213 at a closed end of the shaft receiver 217 and is receivable therein. A fixed collar 255 encircles the operating shaft 248 proximate the open end 242 of the shaft receiver 217 and is secured to the housing 213 by a collar mounting pin 257. Interior to the fixed collar 255, a moveable collar 259 is concentrically mounted on the operating shaft 248 and slidable therewith. A compression spring 260 encircles the operating shaft 248 and has a first end which bears against the fixed collar 255 and a second end which bears against the moveable collar 259. The spring 260 acts to urge the operating shaft 248 longitudinally inward.

Figure 13:
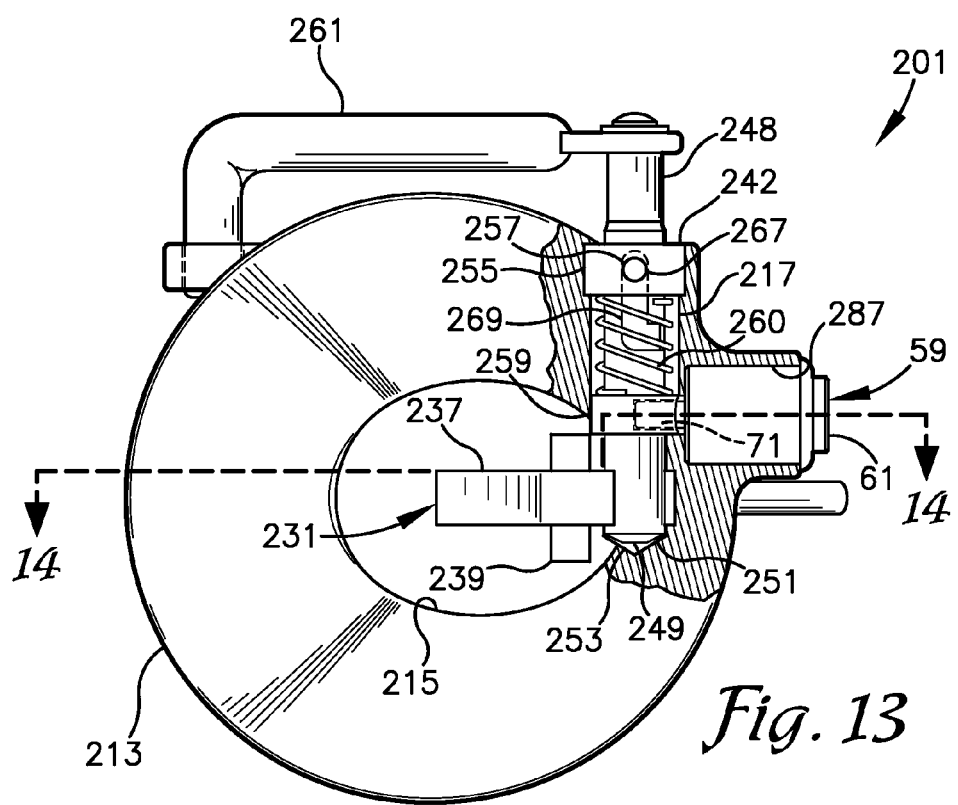
FIG. 13 is a bottom plan view of the coupler of FIG. 12 showing the coupler in a latched and locked state and having a portion of the housing broken away to show internal components of the coupler.

Referring to FIGS. 13 and 14, the shaft receiver 217 extends inwardly behind the lower leg 235 of the latch member 231. When the operating shaft 248 is slid fully inwardly with the latch member 231 in its closed position, the operating shaft 248 abuts against the rearward surface 238 of the lower leg 235 and prevents rearward movement of the lower leg 235, and thereby prevents the latch member 231 from moving to its open position. This may be referred to as the latched position of the operating shaft 248. In the latched position, the interior end 249 of the operating shaft 248 is received in the receiver 253.

Figure 12:
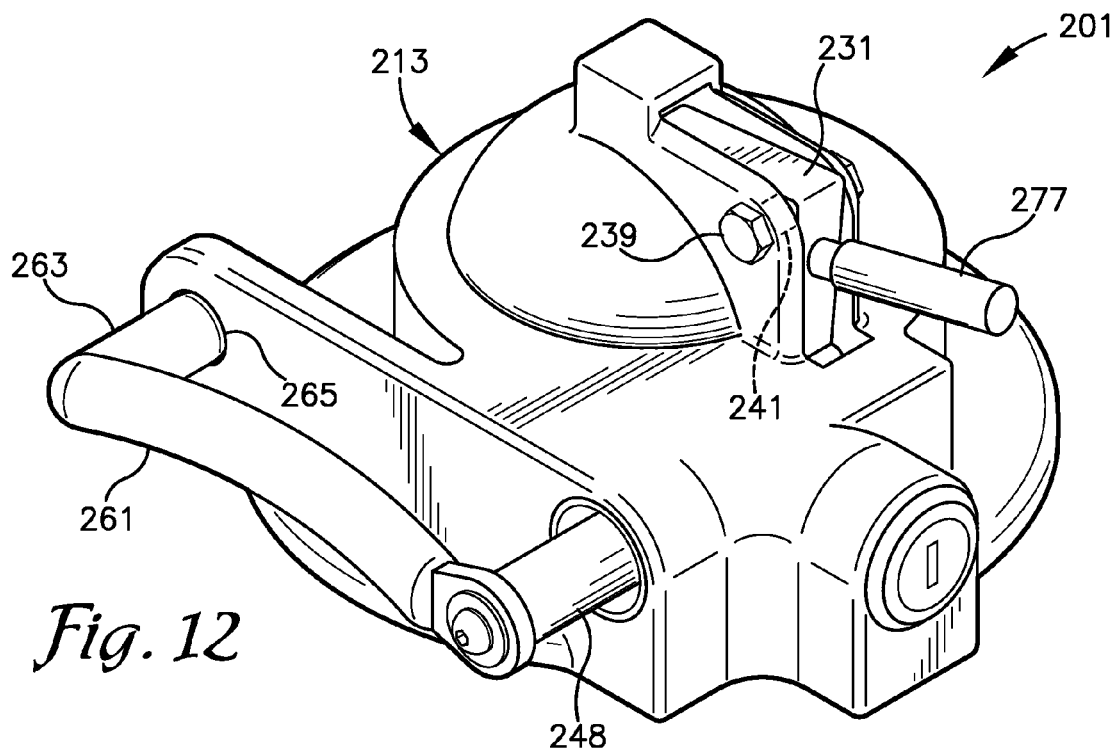
FIG. 12 is a perspective view of a second alternative embodiment of the coupler.

As best seen in FIG. 12, the operating shaft 248 extends outward to the exterior of the housing 213 and has an operating lever or handle 261 secured thereto for use in sliding and rotating the operating shaft 248. The operating shaft 248 may be moved into an unlatched position by pulling outwardly on the handle 261 against the bias of the spring 260 to draw the operating shaft 248 out from behind the lower leg 235 of the latch member 231. When the operating shaft 248 is in its unlatched position, the latch member 231 may pivot without obstruction into the shaft receiver 217 and into its open position. The operating handle 261 may be generally L-shaped and include an inwardly extending leg 263 which is received in an aligned handle receiver 265 in the housing 213 when the operating shaft 248 is in its latched position.

Referring to FIGS. 13 and 13a, a pin 267 extends radially inwardly from the fixed collar 255 and extends into a groove 269 formed in the operating shaft 248. The pin 267 may comprise an inwardly extending portion of the mounting pin 257. The groove 269 is generally L-shaped and includes a longitudinally extending leg 271 and a circumferentially extending leg 273. The pin 267 travels along the longitudinally extending leg 271 as the operating shaft 248 is advanced longitudinally inwardly and outwardly between the latched and unlatched positions. In the unlatched position, the operating shaft 248 may be rotated by moving the operating handle 261 upwardly, thereby causing the pin 267 to enter the circumferentially extending leg 273 of the groove 269, as shown in FIG. 15. When the operating shaft 248 is so rotated, and the pin 267 acts to prevent the operating shaft 248 from moving into its latched position by limiting inward axial movement of the operating shaft 248. The pin 267, however, does allow the operating shaft 248 to move inwardly a distance sufficient for the beveled surface 251 on the interior end 249 of the operating shaft 248 to contact the lower leg 235 of the latch member 231.

In this unlatched and rotated position of the operating shaft 248 and handle 261, the operating handle 261 is raised above horizontal and the weight of the handle 261 attempts to urge the handle 261 downwardly. This downward force on the handle 261 creates a torsional force on the operating shaft 248 which attempts to dislodge the pin 267 from the circumferentially extending leg 273. A slight indentation or notch 275 formed in an outer edge of the circumferentially extending leg 273 functions as a catch and resists the torsional force caused by the weight of the handle 261 and retains the pin 267 in the circumferentially extending leg 273 of the groove 269. In this position, the operating shaft 248 may be described as being in an unlatched and set position.

A latch member setting lever 277 is attached to the latch member 231 and extends generally upwardly and rearwardly therefrom and will extend through a slot (not shown) formed in the post 11 upon which the coupler 201 is mounted. The latch member setting lever 277 can be used to manually move the latch member 231 between its open and closed positions.

A lock pin receiver 279 is formed in the moveable collar 259 (and/or in operating shaft 248). A lock receiver 287 is formed in the housing 213 adjacent and perpendicular to the shaft receiver 217. The lock receiver 287 receives a plunger type lock assembly 59. The plunger type lock assembly 59 has the features and is installed as described in the previous embodiments.

Referring to FIGS. 13 and 14, when the operating shaft 248 is in the latched position, the lock pin receiver 279 formed in the operating shaft 248 is aligned with the lock pin 71 formed on the plunger 61 of the lock assembly 59. The plunger 61 of the lock assembly 59 may be pressed inwardly when the operating shaft 248 is in the latched position causing the lock pin 71 to be received in the lock pin receiver 279. Once the plunger 61 is fully depressed, the lock bolt 67 will engage the bolt receiver 69, thereby preventing the lock pin 71 from pulling out of the lock pin receiver 279. With the lock pin 71 engaged with the lock pin receiver 279, the operating shaft 248 cannot be moved out of the latched position, nor can the latch member 231. This will prevent the coupler 201 from being removed from a hitch ball 3 if the trailer is currently connected to a towing vehicle, or will prevent the coupler 201 from accepting a hitch ball 3 if the trailer is not currently connected. In either event, theft of the trailer is substantially inhibited.

The lock assembly 59 is operated with a key (not shown) to release the lock pin 71 from the locked position. The key is inserted into the lock cylinder 65 and turned, thereby releasing the lock bolt 67 from the bolt receiver 69. The plunger 61 will then move outwardly relative to the lock housing 63, drawing the lock pin 71 out of the lock pin receiver 279 in the operating shaft 248.

Figure 16:
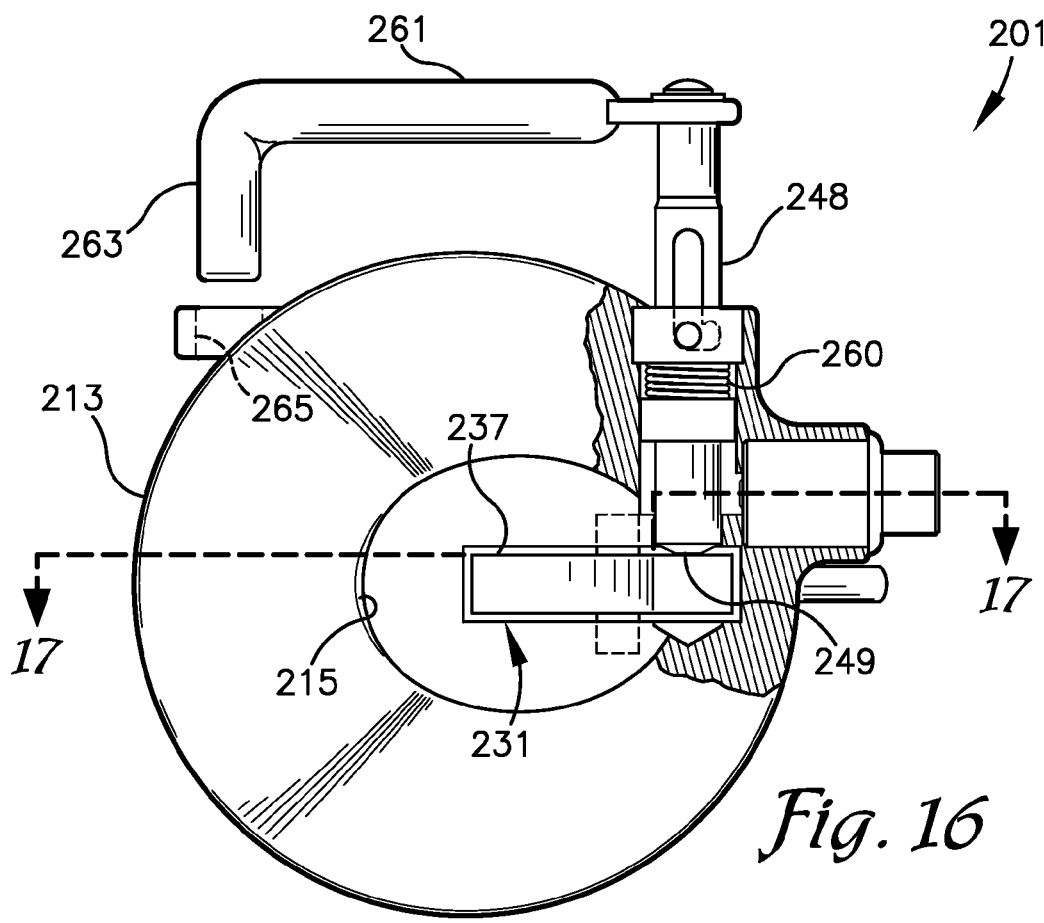
FIG. 16 is a view similar to FIGS. 13 and 15 showing the coupler in an armed state prepared for self-latching.

In use, the coupler 201 is self-latching; if the coupler 201 is lowered onto the hitch ball 3 with the operating shaft 248 and handle 261 in either the unlatched and set position as in FIG. 15 or in an armed position as shown in FIG. 16 and described hereafter, the coupler 201 will automatically latch once the hitch ball 3 is received in the ball receiver 215. With the operating shaft in the unlatched and set position, as a hitch ball 3 enters the ball receiver 215, the ball 3 will engage the lower leg 235 of the latch member 231 thereby causing the lower leg 235 to move outwardly toward its unlatched or open position. Referring to FIG. 15, movement of the latch member 231 into the operating shaft receiver 217 causes the rearward surface 238 of the lower leg 235 to push against the beveled edge surface 251 around the interior end 249 of the operating shaft 248. As the latch member 231 rotates into the operating shaft receiver 217, the operating shaft 248 will be pushed outward along the operating shaft receiver 217 a distance equal to the length of the beveled surface 251 and cause the notch 275 in the circumferential leg 273 of the groove 269 to release from the pin 267, allowing and the handle 261 to rotate back toward its horizontal position under the weight of the handle 261. As the handle 261 moves toward horizontal, the operating shaft 248 will rotate, allowing the longitudinal leg 271 of the groove 269 to align with the pin 267, as shown in FIG. 16. In this position, the spring 260 will urge the operating shaft 248 inward against the latch member 231 (which is in the open position) with the interior end 249 of the operating shaft 248 bearing against the outer side surface 237 of the latch member 231. This may be referred to as the armed position of the operating shaft 248. It is to be understood that when the coupler 210 is separated from the hitch ball 3, the latch member 231 will be pivoted completely into the open position as shown in FIG. 16 such that the operating shaft 248 will be in the armed position the next time the coupler 210 is lowered onto a hitch ball 3 unless the user has manually pivoted the latch member 231 to its closed position to allow the operating shaft 248 to move to the latched position so the couple can be locked.

Referring to FIG. 17, and with the operating shaft 248 in the armed position, if the coupler 201 is further lowered onto the hitch ball 3, the head 5 of the hitch ball 3 will engage the upper leg 233 of the latch member 231 causing the latch member 231 to pivot about the pivot pin 239. The pivoting movement of the latch member 231 causes the lower leg 235 of the latch member 231 to move out of the operating shaft receiver 217. With no obstruction in the operating shaft receiver 217, the operating shaft 248 is urged inwardly behind the lower leg 235 of the latch member 231 and into its latched position, as shown in FIG. 13. As the spring 260 urges the operating shaft 248 inward, the handle receiver 265 receives the inwardly extending leg 263 of the handle 261 to restrain the handle 261 from rotating. The lock assembly 59 can then be engaged to lock the operating shaft 248 in position. The trailer cannot then be removed from the towing vehicle without use of the key.

To remove the trailer from the towing vehicle, the key is inserted into the lock assembly 59 and turned, thereby releasing the lock pin 71 from the lock pin receiver 279 in the operating shaft 248. The operating lever 261 is then moved upwardly and outwardly, thereby advancing the operating shaft 248 into its unlatched and set position. The trailer is then jacked upwardly. As the coupler 201 moves upwardly relative to the ball 5, the latch member 231 moves into its open position, which allows the ball 5 to come out of the ball receiver 215.

It should be noted that as the head 5 of the ball 3 moves past the lower leg 235 of the latch member 231, the ball 3 nudges the lower leg 235 rearwardly. This rearward motion of the lower leg 235 causes the rearward surface 238 of the lower leg 235 to push against the beveled edge surface 251 around the interior end 249 of the operating shaft 248, and results in the pin 267 being dislodged from the circumferential leg 273 of the groove 269 as described above. The handle 261 is then allowed to rotate back toward its horizontal position under the weight of the handle 261, allowing the longitudinal leg 271 of the groove 269 to align with the pin 267. The spring 260 then urge the operating shaft 248 inward against the latch member 231 and into the armed position. The coupler 201 is then armed and ready to be reconnected to a towing vehicle without the need to reposition the handle 261. The coupler 201 can, therefore, be said to be "self-arming" as well as "self-latching."

The coupler 201 can also be locked when the trailer is not attached to a towing vehicle in order to prevent the trailer from being coupled to a thief's vehicle. In order to accomplish this, the operating shaft 248 must be moved into the latched position as shown in FIGS. 13 and 14. If the coupler 201 has been detached from a hitch ball 3 and left in the armed position, the setting lever 277 can be used to move the latch member 231 back into the closed position to allow the operating shaft 248 to move behind it. Once the operating shaft 248 is in its latched position, the plunger 61 of the lock assembly 59 can be pushed inwardly to engage the lock pin 71 with the lock pin receiver 279.

FIGS. 18-22 depict a third alternative embodiment of the coupler, denominated herein as coupler 301, which is operationally similar to the coupler 201 described above, but includes some features which are reminiscent of the coupler 101. The coupler 301 includes a housing 313 having a generally hemispherical ball receiver 315 formed therein, a shaft receiver 317 formed rearward of the ball receiver 315 generally transverse thereto, and a latch member receiver 327 which intersects both the ball receiver 315 and the shaft receiver 317.

The latch member receiver 327 receives a generally L-shaped latch member 331. The latch member 331 includes an upper leg 333 and a lower leg 335. An inner surface 336 of the latch member 331 generally matches the profile of the hitch ball 3 and generally defines a lower margin of the upper leg 333 and a forward margin of the lower leg 335. The lower leg 335 further includes an outer side surface 337 and a rearward surface 338. The latch member 331 is pivotally connected to the housing 313 by a pivot pin 339. The pivot pin 339 extends through a pivot pin receiver 340 in the latch member 331 and aligned openings 341 in the housing 313. The pivot pin receiver 340 is located proximate the juncture of the upper leg 333 with the lower leg 335.

Figure 19:
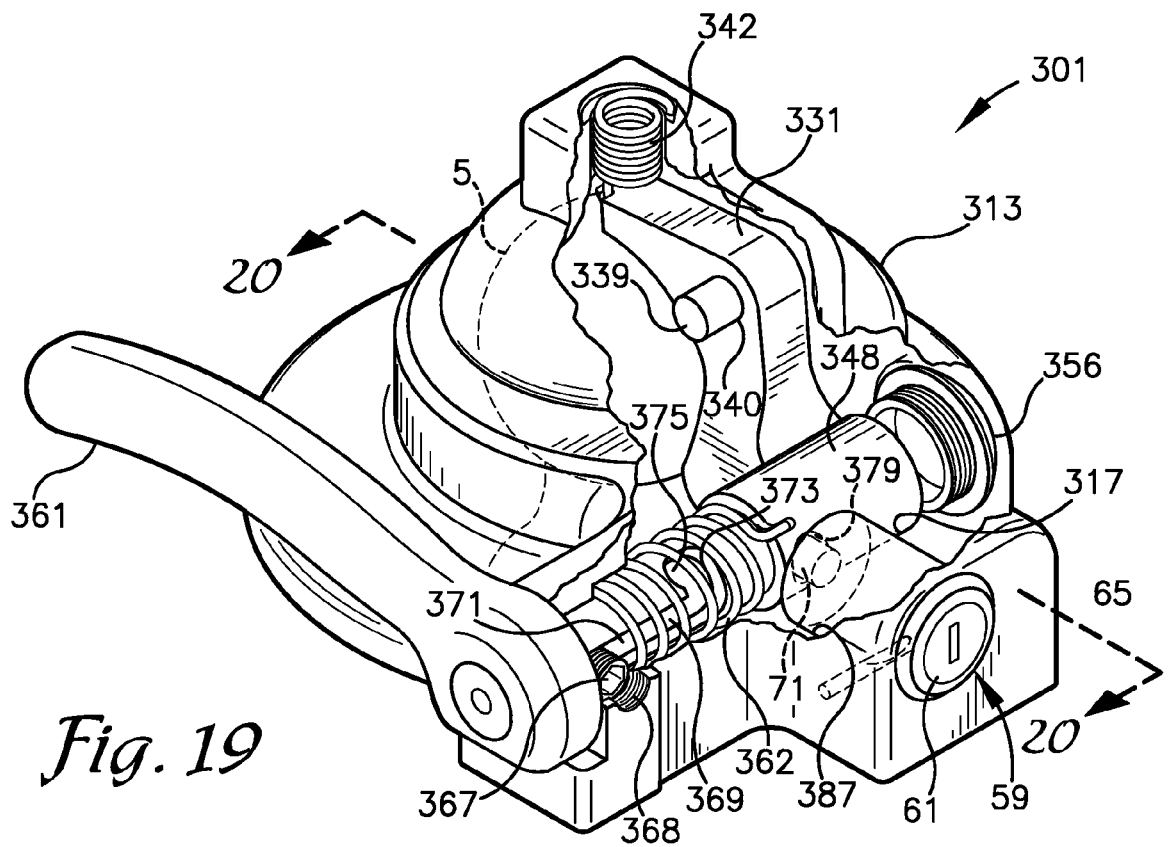
FIG. 19 is a view similar to FIG. 18 but having portions of a housing of the coupler broken away to show internal elements of the coupler in a closed latched and locked state.
Figure 20:
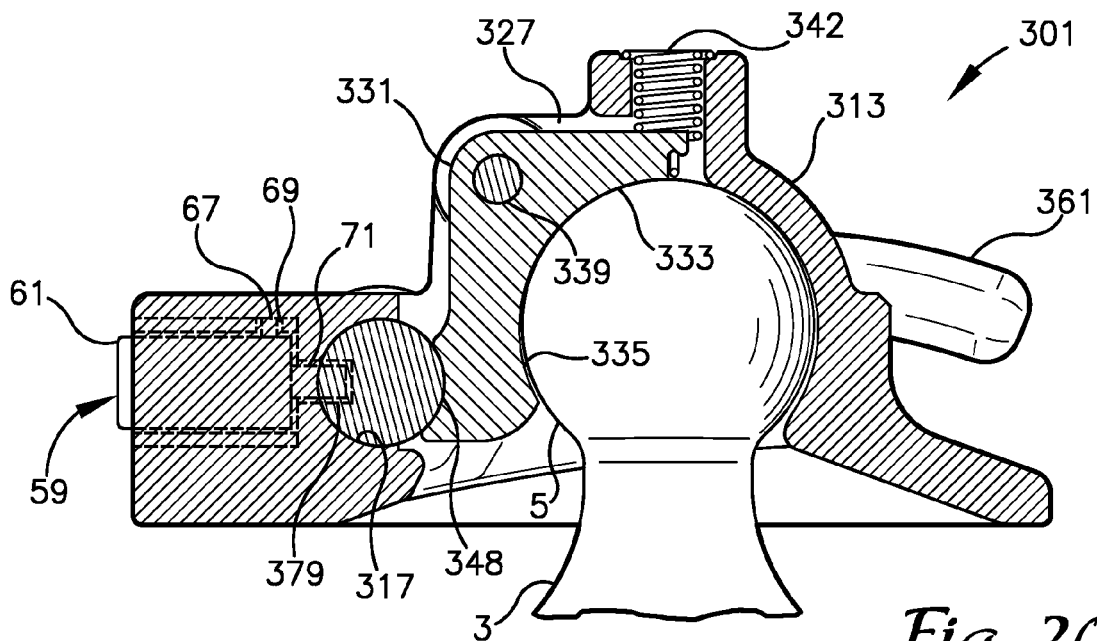
FIG. 20 is a cross-sectional view of the coupler taken generally along line 20-20 in FIG. 19.

The latch member 331 is pivotally movable about the pivot pin 339 from an open position to a closed position. Referring to FIGS. 19 and 20, in the closed position, the lower leg 335 of the latch member 331 extends into the ball receiver 315 at a position below the widest part of the head 5 of a hitch ball 3 seated in the ball receiver 315 to prevent the head 5 of the hitch ball 3 from being withdrawn from the ball receiver 315. In the open position, as shown in FIGS. 21 and 22, the head 5 of the hitch ball 3 is unobstructed by the lower leg 335 of the latch member 331 and is freely moveable in and out of the ball receiver 215.

Figure 22:
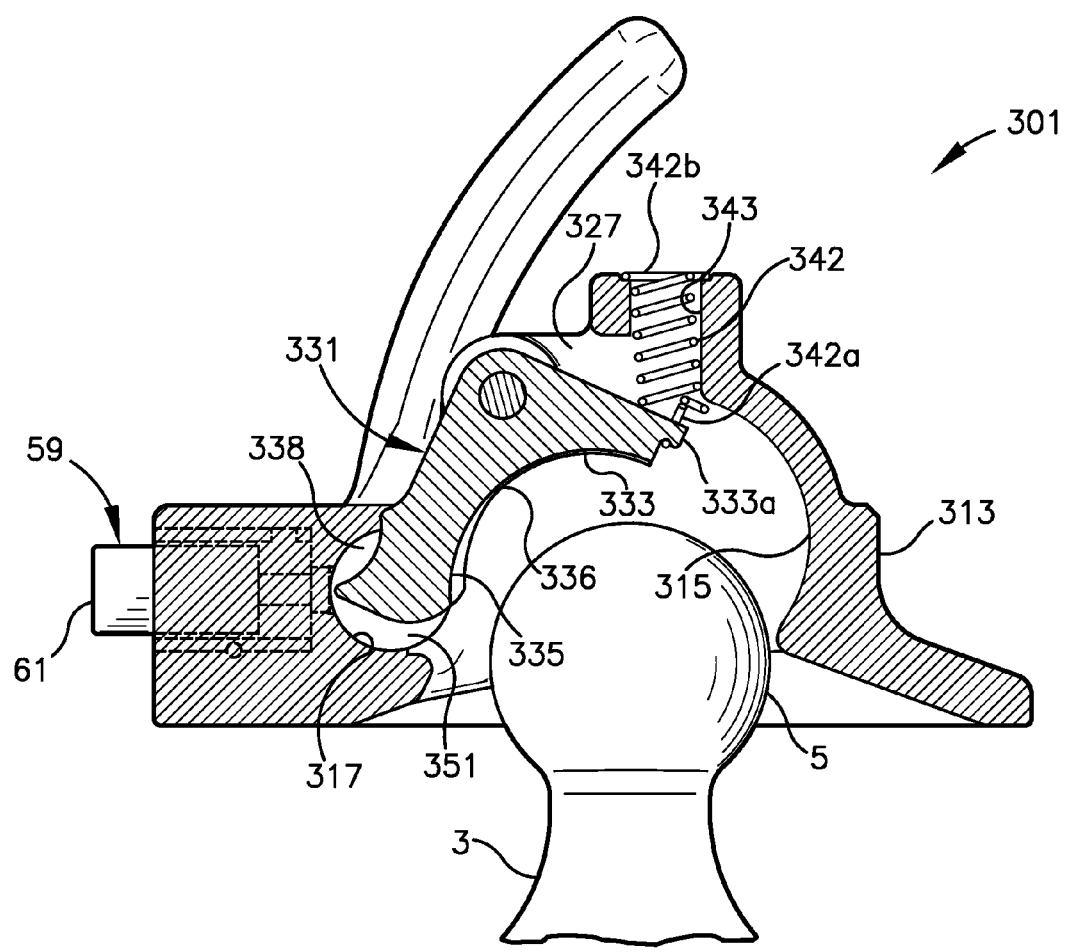
FIG. 22 is a cross-sectional view of the coupler taken generally along line 22-22 in FIG. 21.

As best seen in FIG. 22, a tension spring 342 is positioned between the upper leg 333 of the latch member 331 and the housing 313, urges the latch member 331 toward the closed position. A lower end of the tension spring 342 includes a loop 342*a* which receives an ear 333*a* formed on a distal end of the upper leg 333. An upper end of the tension spring 342 is received through an opening 343 formed in the housing 313. An enlarged coil 342*b* on the upper end of the tension spring 342 is larger in diameter than the opening 343 and prevents the tension spring 342 from pulling through the opening 343.

Figure 21:
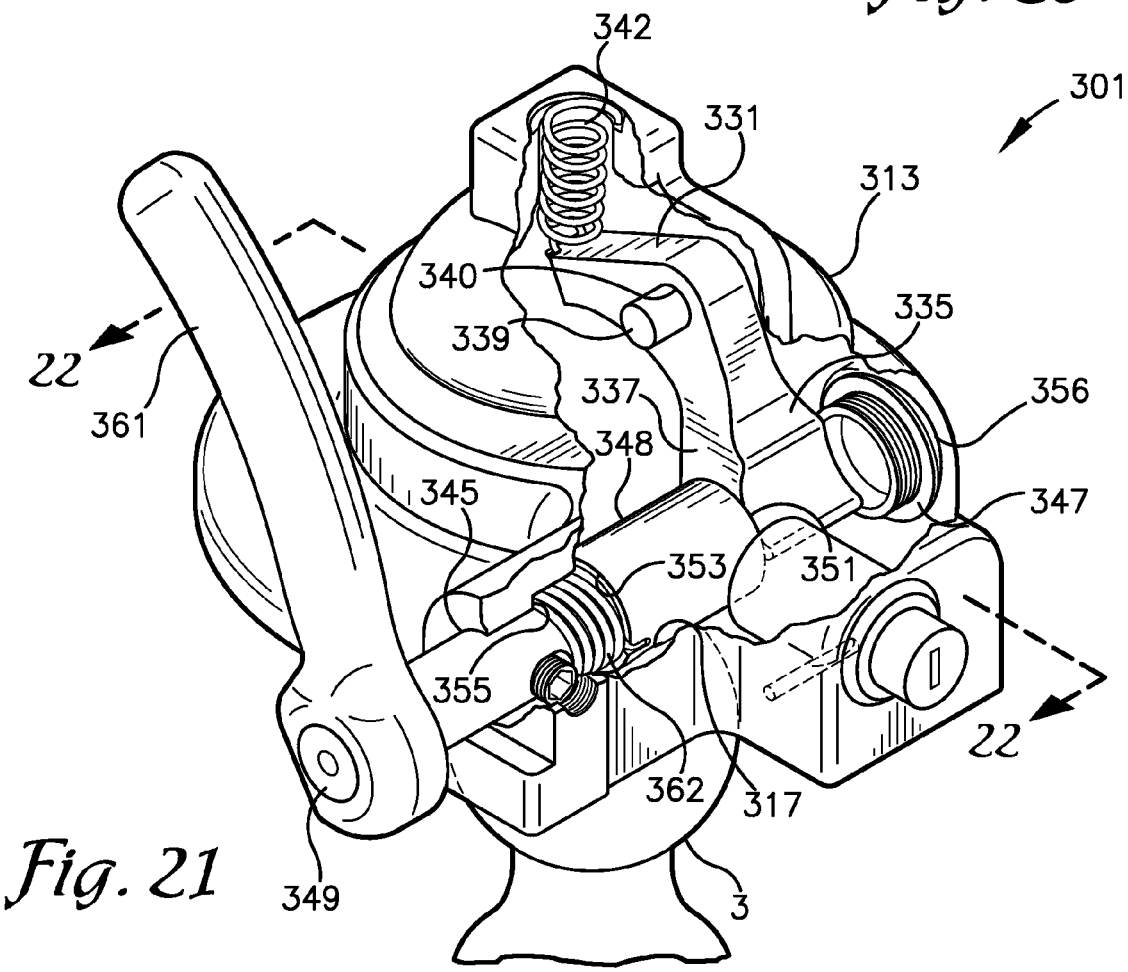
FIG. 21 is a view similar to FIG. 19 but showing the coupler in an open state.

Referring to FIG. 21, the shaft receiver 317 includes a first open end 345 and a second open end 347 and receives a generally cylindrical operating shaft 348, which includes first and second ends 349 and 351, respectively, which correspond to the first and second ends 345 and 347 of the shaft receiver 317. The operating shaft 348 is of reduced diameter for a portion of its length extending from the first end 349 to an annular shoulder 353. A corresponding shoulder 355 is formed in the housing 313 and extends into the shaft receiver 317. The second or interior end 251 of the operating shaft 348 has a conical or frusto-conical shape (not shown, but similar to the interior end 249 of the operating shaft 248 shown above) and thus presents a tapered or beveled edge to the lower leg 335 of the latch member 331. A cap 356 is placed over the second end 347 of the shaft receiver 317, thereby preventing dirt and moisture from entering the shaft receiver 317.

The operating shaft 348 is slidably and rotatably moveable within the shaft receiver 317. The first end 349 of the operating shaft 348 extends outward to the exterior of the housing 313 and has an operating lever or handle 361 secured thereto for use in sliding and rotating the operating shaft 348. A spring 362 encircles the operating shaft 348 and acts both as a compression spring to urge the operating shaft longitudinally inward and as a torsional spring to urge the handle 361 downwardly. The spring 362 has a first end which is connected to and bears against the shoulder 353 of the operating shaft 348 and a second end which is connected to and bears against the shoulder 355 formed in the housing 313.

The shaft receiver 317 extends inwardly behind the lower leg 335 of the latch member 331. Referring to FIGS. 19 and 20, when the operating shaft 348 is slid fully inwardly with the latch member 331 in its closed position, the operating shaft 348 abuts against the rearward surface 338 of the lower leg 335 and prevents rearward movement of the lower leg 335, and thereby prevents the latch member 331 from moving to its open position. This may be referred to as the latched position of the operating shaft 348.

Referring to FIGS. 21 and 22, the operating shaft 348 may be moved into an unlatched position by pulling outwardly on the handle 361 against the bias of the spring 362 to draw the operating shaft 348 out from behind the lower leg 335 of the latch member 331. When the operating shaft 348 is in its unlatched position, the latch member 331 may pivot without obstruction into the shaft receiver 317 and into its open position.

Referring to FIG. 19, a pin 367 extends radially inwardly from the housing 313 and into the shaft receiver 317 in position to extend into a groove 369 formed in the operating shaft 248. The pin 367 may comprise a set screw threadably received in a threaded receiver 368 in the housing 313. The groove 369 is generally L-shaped and includes a longitudinally extending leg 371 and a circumferentially extending leg 373. The pin 367 travels along the longitudinally extending leg 371 as the operating shaft 348 is advanced longitudinally inwardly and outwardly between the latched and unlatched positions. In the unlatched position, the operating shaft 348 may be rotated by moving the operating handle 361 upwardly, thereby causing the pin 367 to enter the circumferentially extending leg 373 of the groove 369, as shown in FIG. 21. When the operating shaft 348 is so rotated, and the pin 367 acts to prevent the operating shaft 348 from moving into its latched position by limiting inward axial movement of the operating shaft 348. The pin 367, however, does allow the operating shaft 348 to move inwardly a distance sufficient for the tapered or beveled edge of the interior end 351 of the operating shaft 348 to contact the lower leg 335 of the latch member 331.

In this unlatched and rotated or unlatched and set position of the operating shaft 348 and handle 361 (see FIG. 21), the operating handle 361 is raised above horizontal and the torsional force of the spring 362 plus the weight of the handle 361 attempts to urge the handle 361 downwardly. This downward force on the handle 361 creates a torsional force on the operating shaft 348 which attempts to dislodge the pin 367 from the circumferentially extending leg 373. Extension of the pin 367 in a slight indentation or notch 375 formed in an outer edge of the circumferentially extending leg 373 functions as a catch and resists the torsional force and retains the pin 367 in the circumferentially extending leg 373 of the groove 369.

A lock pin receiver 379 is formed in the operating shaft 348. A lock receiver 387 is formed in the housing 313 adjacent and perpendicular to the shaft receiver 317. The lock receiver 387 receives a plunger type lock assembly 59. The plunger type lock assembly 59 has the features and is installed as described in the previous embodiments.

Referring to FIG. 20, when the operating shaft 348 is in the latched position, the lock pin receiver 379 formed in the operating shaft 348 is aligned with the lock pin 71 formed on the plunger 61 of the lock assembly 59. The plunger 61 of the lock assembly 59 may be pressed inwardly when the operating shaft 348 is in the latched position causing the lock pin 71 to be received in the lock pin receiver 379. Once the plunger 61 is fully depressed, the lock bolt 67 will engage the bolt receiver 69, thereby preventing the lock pin 71 from pulling out of the lock pin receiver 379. With the lock pin 71 engaged with the lock pin receiver 379, the operating shaft 348 cannot be moved out of the latched position, nor can the latch member 331. This will prevent the coupler 301 from being removed from a hitch ball 3 if the trailer is currently connected to a towing vehicle, or will prevent the coupler 301 from accepting a hitch ball 3 if the trailer is not currently connected. In either event, theft of the trailer is substantially inhibited.

The lock assembly 59 is operated with a key (not shown) to release the lock pin 71 from the locked position. The key is inserted into the lock cylinder 65 and turned, thereby releasing the lock bolt 67 from the bolt receiver 69. The plunger 61 will then move outwardly relative to the lock housing 63, drawing the lock pin 71 out of the lock pin receiver 379 in the operating shaft 348.

In use, the coupler 301 is self-latching; if the coupler 301 is lowered onto the hitch ball 3 with the operating shaft 348 in the unlatched and set position (see FIG. 21) or from the armed position as shown in FIG. 22 and described hereafter, the coupler 301 will automatically latch once the hitch ball 3 is received in the ball receiver 315. As a hitch ball 3 enters the ball receiver 315 with the operating shaft 348 in the unlatched and set position, the ball 3 will engage the lower leg 335 of the latch member 331 thereby causing the lower leg 335 to move outwardly toward its open position. Movement of the latch member 331 into the operating shaft receiver 317 causes the rearward surface 338 of the lower leg 335 to push against the beveled edge of the interior end 351 of the operating shaft 348. As the latch member 331 rotates into the operating shaft receiver 317, the operating shaft 348 will be pushed outward along the operating shaft receiver 317 a distance equal to the length of the bevel on the end 351 and cause the notch 375 in the circumferential leg 373 of the groove 369 to release from the pin 367, allowing and the handle 361 to rotate back toward its horizontal position under the torsional force of the spring 362 and weight of the handle 361. As the handle 361 moves toward horizontal, the operating shaft 348 will rotate, allowing the longitudinal leg 371 of the groove 369 to align with the pin 367. In this position, the spring 362 will urge the operating shaft 348 inward against the latch member 331 (which is in the open position, as shown in FIG. 22) with the interior end 349 of the operating shaft 348 bearing against the outer side surface 337 of the latch member 331. This may be referred to as the armed position of the operating shaft 348.

If the coupler 301 is further lowered onto the hitch ball 3, with the operating shaft in the armed position, the head 5 of the hitch ball 3 will engage the upper leg 333 of the latch member 331 causing the latch member 331 to pivot about the pivot pin 339. The pivoting movement of the latch member 331 causes the lower leg 335 of the latch member 331 to move out of the operating shaft receiver 317. With no obstruction in the operating shaft receiver 317, the operating shaft 348 is urged inwardly behind the lower leg 335 of the latch member 331 and into its latched position by the spring 362, as shown in FIGS. 19 and 20. The lock assembly 59 can then be engaged to lock the operating shaft 348 in position. The trailer cannot then be removed from the towing vehicle without use of the key.

To remove the trailer from the towing vehicle, the key is inserted into the lock assembly 59 and turned, thereby releasing the lock pin 71 from the lock pin receiver 379 in the operating shaft 348. The operating lever 361 is then moved upwardly and outwardly, thereby advancing the operating shaft 348 into its set position. The trailer is then jacked upwardly. As the coupler 301 moves upwardly relative to the ball 5, the latch member 331 moves into its open position, which allows the ball 5 to come out of the ball receiver 315.

It should be noted that as the head 5 of the ball 3 moves past the lower leg 335 of the latch member 331, the ball 3 nudges the lower leg 335 rearwardly. This rearward motion of the lower leg 335 causes the rearward surface 338 of the lower leg 335 to push against the beveled edge of the interior end 351 of the operating shaft 348, and results in the pin 367 being dislodged from the circumferential leg 373 of the groove 369 as described above. The handle 361 is then allowed to rotate back toward its horizontal position under the torsional force of the spring 362 and the weight of the handle 361, allowing the longitudinal leg 371 of the groove 369 to align with the pin 367. The spring 362 then urges the operating shaft 348 inward against the latch member 331 and into the armed position. The force of the operating shaft 348 acting against the side of the latch member 331 is sufficient to resist the force of the tension spring 342 and thereby retain the latch member 331 in the open position. The coupler 301 is then armed and ready to be reconnected to a towing vehicle without the need to reposition the handle 361. The coupler 301 can, therefore, be said to be "self-arming" as well as "self-latching."

The coupler 301 can also be locked when the trailer is not attached to a towing vehicle in order to prevent the trailer from being coupled to a thief's vehicle. In order to accomplish this, the operating shaft 348 must be moved into the latched position as shown in FIGS. 19 and 20. If the coupler 301 has been detached from a hitch ball 3 and left in the armed position, the user needs only pull outwardly on the handle 361 in order to release the latch member 331 and let it move back into the closed position under the force of the tension spring 342. The user then releases the handle 361 to allow the biasing force of spring 362 to urge or cause the operating shaft 348 to move to the latched position, behind the latch member 33 which has pivoted to the closed position. Once the operating shaft 348 is in its latched position, the plunger 61 of the lock assembly 59 can be pushed inwardly to engage the lock pin 71 with the lock pin receiver 379.

It is to be understood that while certain forms of the present invention have been illustrated and described herein, it is not to be limited to the specific forms or arrangement of parts described and shown. For example, in the second and third alternative embodiments described above, the inward end of the operating shaft has been described as being of a frusto-conical shape in order to provide a tapered or beveled edge for the rearward side of the latch member to act against in order to move the shaft outwardly. It is foreseen, however, that the inward end of the operating shaft in these embodiments could also be conical, hemispherical, bullet-shaped, or the like, so long as the rearward movement of the latch member can engage the operating shaft to cause an outward longitudinal movement of the operating shaft. The use of the words "tapered" or "beveled" in the claims to describe this edge should therefore be interpreted broadly enough to encompass these other shapes.

As used in the claims, identification of an element with an indefinite article "a" or "an" or the phrase "at least one" is intended to cover any device assembly including one or more of the elements at issue. Similarly, references to first and second elements, or to a pair of elements, is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed and desired to be secured by Letters Patent is as follows:

1. A coupler for connecting a trailer to a hitch ball on a towing vehicle, said coupler comprising:
    a) a housing having a downwardly oriented ball receiver for receiving a head of a hitch ball;
    b) latch means mounted in said housing and including a latch member moveable between open and closed positions, in said closed position a portion of said latch member extending beneath the head of a hitch ball received in said ball receiver,
    c) self-latching means for automatically moving said latch member into said closed position upon insertion of the head of a hitch ball into said ball receiver and retaining said latch member in said closed position; and
    d) a lock assembly mounted in said housing and including a locking member selectively engageable with said latch means to lock said latch member in said closed position.

2. The coupler as in claim 1 wherein said latch member is a cylindrical latch pin laterally moveable within a latch pin receiver formed in said housing between said open and closed positions.

3. The coupler as in claim 2 wherein said self-latching means includes said latch pin receiver having a kidney shape with a lower lobe and an upper lobe, said latch pin positioned in said lower lobe in said closed position and positioned in said upper lobe in said open position, said receiver sized and shaped to allow a hitch ball to push said latch pin from said closed position in said lower lobe into said upper lobe as the hitch ball is inserted into said ball receiver and to allow said latch pin to drop back into said closed position in said lower lobe once a widest part of the hitch ball has moved past said lower lobe, said latch pin thereafter trapped in said lower lobe by said hitch ball such that any separating force attempting to draw the hitch ball out of said ball receiver will push said latch pin downwardly and more firmly into said lower lobe.

4. The coupler as in claim 2 wherein said locking member of said lock assembly is selectively engageable with said latch pin when said latch pin is in said closed position.

5. The coupler as in claim 1 wherein said latch member is generally L-shaped and includes an upper leg positioned to be engaged by a top of a hitch ball inserted into said ball receiver and a lower leg extending downwardly from said upper leg, said latch member pivotally connected to said housing such that said lower leg pivots into said ball receiver below a widest part of the hitch ball when said latch member is in said closed position and pivots clear of said hitch ball when said latch member is in said open position.

6. The coupler as in claim 5 wherein said latch means further includes an operating shaft selectively moveable into engagement with said latch member when said latch member is in said closed position to prevent said latch member from moving into said open position.

7. The coupler as in claim 6 wherein said operating shaft is rotatably mounted and includes a cam surface engageable with a cam follower on said lower leg of said latch member, said operating shaft rotatably moveable between a latched position wherein said cam surface urges said lower leg into said closed position and an unlatched position wherein said cam surface allows said latch member to move freely between said open and closed positions.

8. The coupler as in claim 7 wherein said latch means further includes a latch member spring acting on said latch member and urging said cam follower against said cam surface, said latch member thereby applying pressure against said cam surface and creating resistance to rotation of said operating shaft.

9. The coupler as in claim 8 wherein said self-latching means includes:
    a) an operating shaft spring acting on said operating shaft and urging said operating shaft toward said latched position, and
    b) said operating shaft is further rotatable into an armed position wherein upon the top of the hitch ball contacting said upper leg of said latch member, said cam follower will pivot away from said cam surface and release sufficient pressure acting against said cam surface for said operating shaft spring to overcome said resistance to rotation of said operating shaft and move said operating shaft into said latched position.

10. The coupler as in claim 9 wherein said locking member of said lock assembly is selectively engageable with said operating shaft when said operating shaft is in said latched position.

11. The coupler as in claim 6 wherein said operating shaft is longitudinally slidable between an inward latched position wherein said operating shaft extends behind said lower leg of said latch member when said latch member is in said closed position and blocks movement of said latch member toward said open position and an outward unlatched position wherein said latch member can move past said operating shaft and into said open position.

12. The coupler as in claim 11 and further including an operating shaft spring urging said operating shaft into said latched position.

13. The coupler as in claim 12 wherein said operating shaft includes a generally L-shaped groove having a longitudinal leg and a circumferential leg, said groove slidably receiving a pin extending inward from said housing, said pin moving freely along said longitudinal leg as said operating shaft is moved between said latched and said unlatched positions, in said unlatched position said operating shaft being rotatable as said pin moves into said circumferential leg, wherein when said pin is in said circumferential leg said pin prevents said operating shaft from moving into said latched position.

14. The coupler as in claim 13 wherein said self-latching means includes:
a) a tapered surface on said operating shaft proximate an inner end thereof, said tapered surface positioned to be engaged by a rearward face of said lower leg of said latch member when said operating shaft is in the unlatched position and rotated such that said pin is in said circumferential leg of said groove;
b) biasing means for urging said operating shaft to rotate in a direction which moves said pin toward said longitudinal leg of said groove; and
c) said circumferential leg of said groove having a notch which receives said pin, engagement of said pin in said notch preventing the biasing means from rotating said operating shaft; wherein
d) as a hitch ball enters said ball receiver said hitch ball pushes against said lower leg of said latch member causing said latch member to push against said tapered surface on said operating shaft and thereby causes an outward longitudinal movement of said operating shaft as said latch member moves into said open position, the outward movement of the operating shaft dislodging said pin from said notch and allowing said biasing means to rotate said operating shaft until said pin aligns with said longitudinal leg of said groove in an armed position of said operating shaft wherein said inner end of said operating shaft bears against a side surface of said latch member; and
e) as said hitch ball continues into said ball receiver said top of said hitch ball engages said upper leg of said latch member and pivots said latch member into said closed position, said operating shaft moving automatically into said latched position under the force of the operating shaft spring as said lower leg of said latch member clears said operating shaft.

15. The coupler as in claim 14 wherein said locking member of said lock assembly is selectively engageable with said operating shaft when said operating shaft is in said latched position.

16. The coupler as in claim 14 and further including an operating lever connected to said operating shaft for use in selectively sliding and rotating said operating shaft.

17. The coupler as in claim 16 wherein said operating lever is upwardly positioned when said pin is in said circumferential leg of said groove and the weight of said operating lever provides said biasing means.

18. The coupler as in claim 14 wherein said biasing means includes a torsional spring acting on said operating shaft.

19. A coupler for connecting a trailer to a hitch ball on a towing vehicle, said coupler comprising:
a) a housing having a downwardly oriented ball receiver for receiving a head of a hitch ball;
b) a generally L-shaped latch member having an upper leg positioned to be engaged by a top of a hitch ball inserted into said ball receiver and a lower leg extending downwardly from said upper leg, said latch member pivotally connected to said housing and moveable between a closed position and an open position, said lower leg pivoting into said ball receiver below a widest part of the hitch ball when said latch member is in said closed position and pivoting clear of said hitch ball when said latch member is in said open position;
c) an operating shaft longitudinally slidable between an inward latched position wherein said operating shaft extends behind said lower leg of said latch member when said latch member is in said closed position and blocks movement of said latch member toward said open position and an outward unlatched position wherein said latch member can move past said operating shaft and into said open position, said operating shaft including a generally L-shaped groove having a longitudinal leg and a circumferential leg, said groove slidably receiving a pin extending inward from said housing, said longitudinal leg of said groove moving freely along said pin as said operating shaft is moved between said latched and said unlatched positions, in said unlatched position said operating shaft being rotatable to receive said pin into said circumferential leg of said groove, wherein when said pin is in said circumferential leg said pin prevents said operating shaft from moving longitudinally into said latched position;
d) a spring biasing said operating shaft longitudinally inward toward said latched position; and
e) an operating lever connected to said operating shaft for use in selectively sliding and rotating said operating shaft to move said shaft between said latched and unlatched positions.

20. The coupler as in claim 19 and further including:
a) a tapered surface on said operating shaft proximate an inner end thereof, said tapered surface positioned to be engaged by a rearward face of said lower leg of said latch member when said operating shaft is in the unlatched position and rotated such that said pin is in said circumferential leg of said groove;
b) biasing means for urging said operating shaft to rotate in a direction which moves said longitudinal leg of said groove toward said pin; and
c) said circumferential leg of said groove having a notch which receives said pin, engagement of said pin in said notch preventing the biasing means from rotating said operating shaft; wherein
d) as a hitch ball enters said ball receiver said hitch ball pushes against said lower leg of said latch member causing said latch member to push against said tapered surface on said operating shaft and thereby causes an outward longitudinal movement of said operating shaft as said latch member moves into said open position, the outward movement of the operating shaft dislodging said pin from said notch and allowing said biasing means to rotate said operating shaft until said longitudinal leg of said groove aligns with said pin in an armed position of said operating shaft wherein said inner end of said operating shaft bears against a side surface of said latch member; and e) as said hitch ball continues into said ball receiver said top of said hitch ball engages said upper leg of said latch member and pivots said latch member into said closed position, said operating shaft moving automatically into said latched position under the force of the operating shaft spring as said lower leg of said latch member clears said operating shaft.

21. The coupler as in claim 20 and further including a lock assembly mounted in said housing and including a locking member selectively engageable with said operating shaft to lock said latch member in said closed position.

22. The coupler as in claim 21 wherein said operating lever is upwardly positioned when said pin is in said circumferential leg of said groove and the weight of said operating lever provides said biasing means.

23. The coupler as in claim 21 wherein said biasing means includes a torsional spring acting on said operating shaft.

24. The coupler as in claim 23 wherein a single spring acts as both said torsional spring and as said spring biasing said operating shaft longitudinally inward toward said latched position.

25. The coupler as in claim 20 and further including a tension spring connected between said upper leg of said latch member and said housing, said tension spring biasing said latch member toward said closed position.

26. The coupler as in claim 25, wherein when said operating shaft is in said armed position with said inner end of said operating shaft bearing against said side surface of said latch member, the force of said operating shaft bearing said side surface of said latch member is sufficient to resist the force of said tension spring and retain said latch member in said open position.

27. A coupler for connecting a trailer to a hitch ball on a towing vehicle, said coupler comprising:
a) a housing having a downwardly oriented ball receiver for receiving a head of a hitch ball;
b) a latch member having an upper portion positioned to be engaged by a top of a hitch ball inserted into said ball receiver and a lower portion extending downwardly from said upper portion, said latch member pivotally connected to said housing and moveable between a closed position and an open position, said lower portion pivoting into said ball receiver below a widest part of the hitch ball when said latch member is in said closed position and pivoting clear of said widest part of the hitch ball when said latch member is in said open position;
c) an operating shaft advanceable between a latched position, an unlatched and set position and an armed position;
d) means for urging said operating shaft to move from said unlatched and set position to said armed position and means for urging said operating shaft to move from said armed position to said latched position;
e) in said latched position, said operating shaft is positioned relative to said latch member to prevent movement of said latch member out of said closed position; in said armed position, said latch member extends in said open position and blocks said operating shaft from moving to said latched position; in said unlatched and set position, a catch restrains said operating shaft from moving to said armed position and said operating shaft blocks said latch member from moving completely to the open position;
f) with said operating shaft in said unlatched and set position, advancement of a hitch ball head past the lower portion of said latch member completely advances said latch member to said open position and releases said catch allowing said operating shaft to be urged to said armed position; with said operating shaft in said armed position, advancement of a hitch ball head into engagement with said upper portion of said latch member pivots said latch member to said closed position and out of engagement with said operating shaft such that said operating shaft is urged to said latched position.

28. The coupler as in claim 27 further comprising a handle connected to said operating shaft and engageable for moving said operating shaft from said operating shaft from said latched position to said unlatched and set position.

29. The coupler as in claim 27 further comprising a lock assembly mounted in said housing and including a locking member selectively engageable with said operating shaft when said operating shaft is in said latched position to lock said latch member in said closed position.

30. The coupler as in claim 27 wherein said means for urging said operating shaft to move from said unlatched and set position to said armed position and said means for urging said operating shaft to move from said armed position to said latched position comprises a torsional spring acting on said operating shaft.

* * * * *